US012664824B2

(12) United States Patent (10) Patent No.: US 12,664,824 B2
Aggarwal et al. (45) Date of Patent: Jun. 23, 2026

(54) SYSTEM FOR BIOMETRIC IDENTIFICATION ENROLLMENT

(71) Applicant: AMAZON TECHNOLOGIES, INC., Seattle, WA (US)

(72) Inventors: Manoj Aggarwal, Seattle, WA (US); Gerard Guy Medioni, Los Angeles, CA (US); Chad Desjardins, Seattle, WA (US); Dilip Kumar, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 441 days.

(21) Appl. No.: 18/152,403

(22) Filed: Jan. 10, 2023

(65) Prior Publication Data

US 2024/0233444 A1 Jul. 11, 2024

(51) Int. Cl.
*G06V 40/50* (2022.01)
*G06V 10/774* (2022.01)
*G06V 40/70* (2022.01)

(52) U.S. Cl.
CPC ............ *G06V 40/50* (2022.01); *G06V 10/774* (2022.01); *G06V 40/70* (2022.01)

(58) Field of Classification Search
CPC ...... G06V 10/774; G06V 10/80; G06V 10/82; G06V 40/1365; G06V 40/14; G06V 40/50; G06V 40/70
See application file for complete search history.

(56) References Cited

U.S. PATENT DOCUMENTS

| | | | | |
|---|---|---|---|---|
| 10,776,471 | B2 * | 9/2020 | Tussy ..................... | H04W 12/06 |
| 11,527,092 | B1 | 12/2022 | Farber et al. | |
| 2019/0392189 | A1 * | 12/2019 | Kumar ............... | G06V 40/1312 |
| 2020/0151988 | A1 * | 5/2020 | Harding .................. | G07C 9/37 |
| 2021/0042608 | A1 * | 2/2021 | Sun ........................ | G06N 3/065 |
| 2023/0044788 | A1 * | 2/2023 | Osamura ............. | H04L 63/0861 |
| 2023/0401914 | A1 * | 12/2023 | Maeno ............... | G07C 9/00563 |

FOREIGN PATENT DOCUMENTS

CN 112132099 A 12/2020

OTHER PUBLICATIONS

Gaikwad, et al., "Multi-Modal Biometric System using Palm Print and Palm vein Features", 2013 Annual IEEE India Conference, 2013, 5 pgs.

(Continued)

*Primary Examiner* — Michael J Vanchy, Jr.
(74) *Attorney, Agent, or Firm* — Lindauer Law, PLLC

(57) ABSTRACT

User enrollment to a biometric identification system begins with a pre-enrollment process on selected general input devices (GID) such as smartphones. The user may enter identification data such as their name and use a camera of the GID to acquire first image data, such as of their hand. The first image data is processed to determine a first representation. Upon presentation of a hand at a biometric input device, second image data is acquired. The second image data is processed to determine a second representation. If the second representation is deemed to be associated with the first representation, the enrollment process may be completed by storing the second representation for subsequent use.

19 Claims, 16 Drawing Sheets

(56) References Cited

OTHER PUBLICATIONS

Lu, et al., "Cross-modality Person re-identification with Shared-Specific Feature Transfer", 2020 IEEE/CVF Conference on Computer Vision and Pattern Recognition (CVPR), 2020, 11 pgs.

Mitzel, Dennis, "International Search Report and the Written Opinion of the International Searching Authority dated Apr. 17, 2024", Patent Cooperation Treaty Application No. PCT/US24/10284, Patent Cooperation Treaty, Apr. 17, 2024.

Wang, et al., "Person recognition by fusing palmprint and palm vein images based on "Lap lapiacianpalm" representation", ScienceDirect, Feb. 27, 2007, 14 pgs.

Mitzel, Dennis, "Preliminary Report on Patentability and the Written Opinion of the International Searching Authority dated Jul. 24, 2025", Patent Cooperation Treaty Application No. PCT/US24/10284, Patent Cooperation Treaty, Jul. 24, 2025.

\* cited by examiner

200

SUPPLEMENTAL DATA <u>174</u>

SYSTEM METADATA <u>202</u>

Device Identifier

Device Geolocation Data

Timestamp Data

Network address

Software Version

...

USER DATA <u>204</u>

Telephone Number

EMV Card Data

Authentication Code

...

TRAINING DATA 120

TRAINING IDENTITY 302(1)
(e.g. "User4791")

VISIBLE IMAGE DATA
176(1)

LABEL DATA 340(1)

| SAMPLE ID 342(1) (e.g. "User4791") | MODALITY LABEL 344(1) (e.g. "visible") | ... |

NTH MODALITY IMAGE DATA 116(1)

LABEL DATA 340(2)

| SAMPLE ID 342(2) (e.g. "User4791") | MODALITY LABEL 344(2) (e.g. "vein") | ... |

⋮

MTH MODALITY IMAGE DATA 306(1)

LABEL DATA 340(M)

| SAMPLE ID 342(M) (e.g. "User4791") | MODALITY LABEL 344(M) (e.g. "color") | ... |

⋮

TRAINING IDENTITY 302(N)
(e.g. "User5790")

500

700

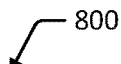

TRAINING DATA 120

VISIBLE IMAGE DATA
176(1)

NTH MODALITY IMAGE
DATA 116(N)

FIRST PROCESSING MODULE 808(1)

INTERMEDIATE LAYER DATA 810

EMBEDDING LAYER DATA 812

SECOND PROCESSING MODULE 808(2)

INTERMEDIATE LAYER DATA 814

EMBEDDING LAYER DATA 816

FIRST
EMBEDDING
SPACE
822(1)

FIRST TRAINING REPRESENTATION DATA
820(1)

SECOND
EMBEDDING
SPACE
822(2)

SECOND TRAINING REPRESENTATION
DATA 820(2)

TRANSFORMER TRAINING DATA 850

FIRST TRAINING
REPRESENTATION DATA
820(1) (E.G. "VISIBLE")

LABEL DATA 856(1)

| SAMPLE ID 342(1) | MODALITY LABEL 344(1) | MODEL LABEL 858(1) | ... |

SECOND TRAINING
REPRESENTATION DATA
820(2) (E.G. "VEIN")

LABEL DATA 856(2)

| SAMPLE ID 342(2) | MODALITY LABEL 344(2) | MODEL LABEL 858(2) | ... |

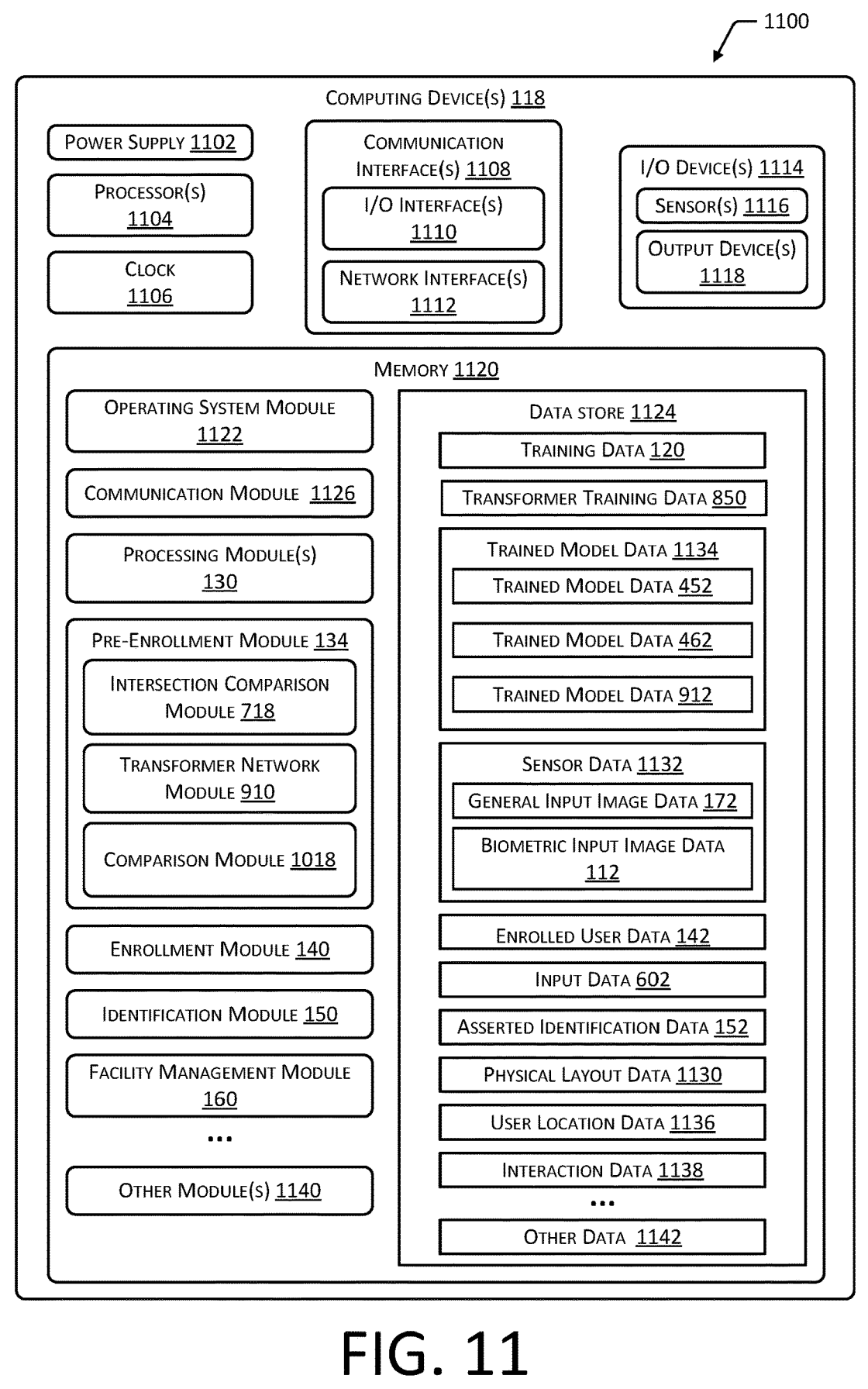

COMPUTING DEVICE(S) 118

POWER SUPPLY 1102

PROCESSOR(S) 1104

CLOCK 1106

COMMUNICATION INTERFACE(S) 1108

I/O INTERFACE(S) 1110

NETWORK INTERFACE(S) 1112

I/O DEVICE(S) 1114

SENSOR(S) 1116

OUTPUT DEVICE(S) 1118

MEMORY 1120

OPERATING SYSTEM MODULE 1122

COMMUNICATION MODULE 1126

PROCESSING MODULE(S) 130

PRE-ENROLLMENT MODULE 134

INTERSECTION COMPARISON MODULE 718

TRANSFORMER NETWORK MODULE 910

COMPARISON MODULE 1018

ENROLLMENT MODULE 140

IDENTIFICATION MODULE 150

FACILITY MANAGEMENT MODULE 160

...

OTHER MODULE(S) 1140

DATA STORE 1124

TRAINING DATA 120

TRANSFORMER TRAINING DATA 850

TRAINED MODEL DATA 1134

TRAINED MODEL DATA 452

TRAINED MODEL DATA 462

TRAINED MODEL DATA 912

SENSOR DATA 1132

GENERAL INPUT IMAGE DATA 172

BIOMETRIC INPUT IMAGE DATA 112

ENROLLED USER DATA 142

INPUT DATA 602

ASSERTED IDENTIFICATION DATA 152

PHYSICAL LAYOUT DATA 1130

USER LOCATION DATA 1136

INTERACTION DATA 1138

...

OTHER DATA 1142

FIG. 11

FIRST TIME

1200

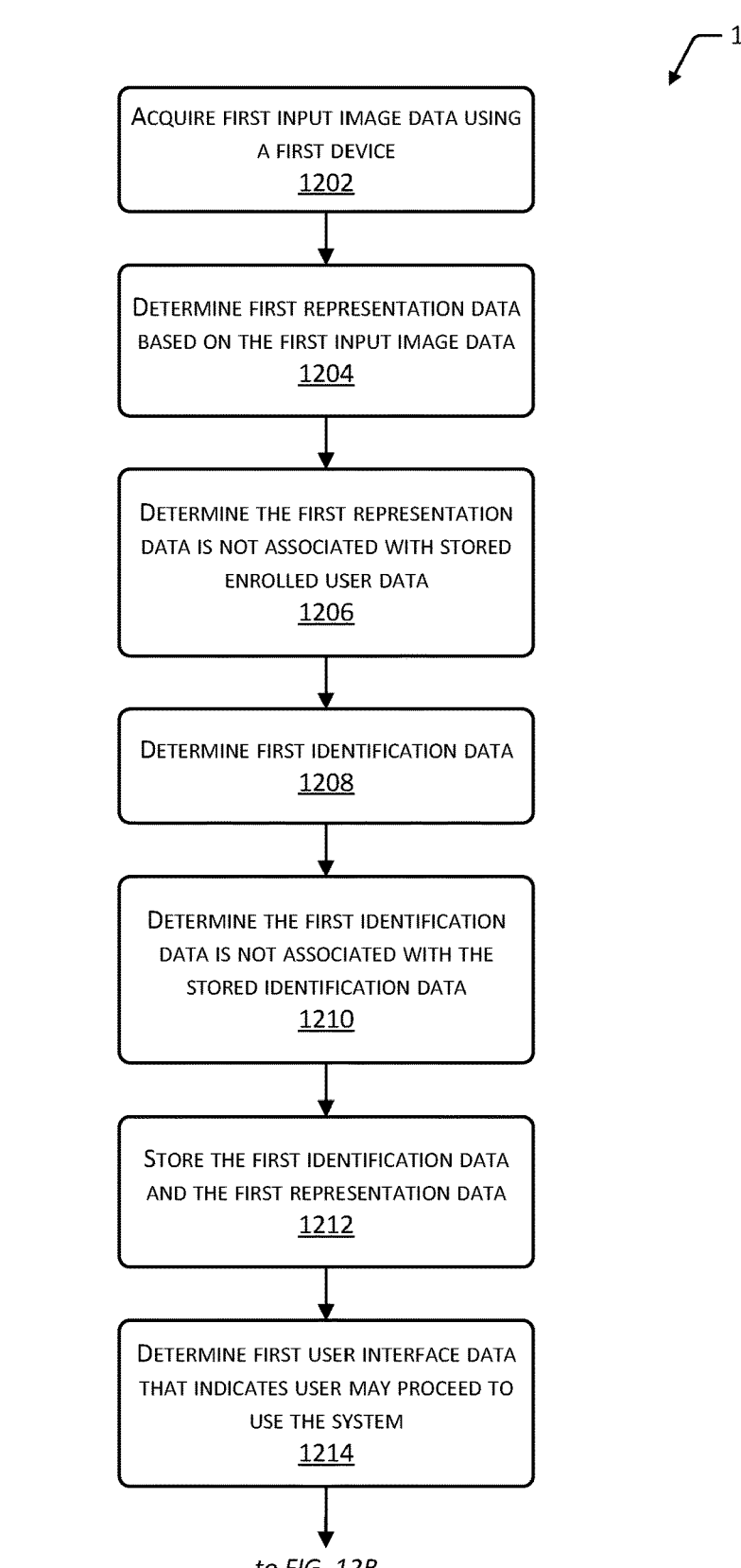

ACQUIRE FIRST INPUT IMAGE DATA USING A FIRST DEVICE
1202

DETERMINE FIRST REPRESENTATION DATA BASED ON THE FIRST INPUT IMAGE DATA
1204

DETERMINE THE FIRST REPRESENTATION DATA IS NOT ASSOCIATED WITH STORED ENROLLED USER DATA
1206

DETERMINE FIRST IDENTIFICATION DATA
1208

DETERMINE THE FIRST IDENTIFICATION DATA IS NOT ASSOCIATED WITH THE STORED IDENTIFICATION DATA
1210

STORE THE FIRST IDENTIFICATION DATA AND THE FIRST REPRESENTATION DATA
1212

DETERMINE FIRST USER INTERFACE DATA THAT INDICATES USER MAY PROCEED TO USE THE SYSTEM
1214 to FIG. 12B

FIG. 12A

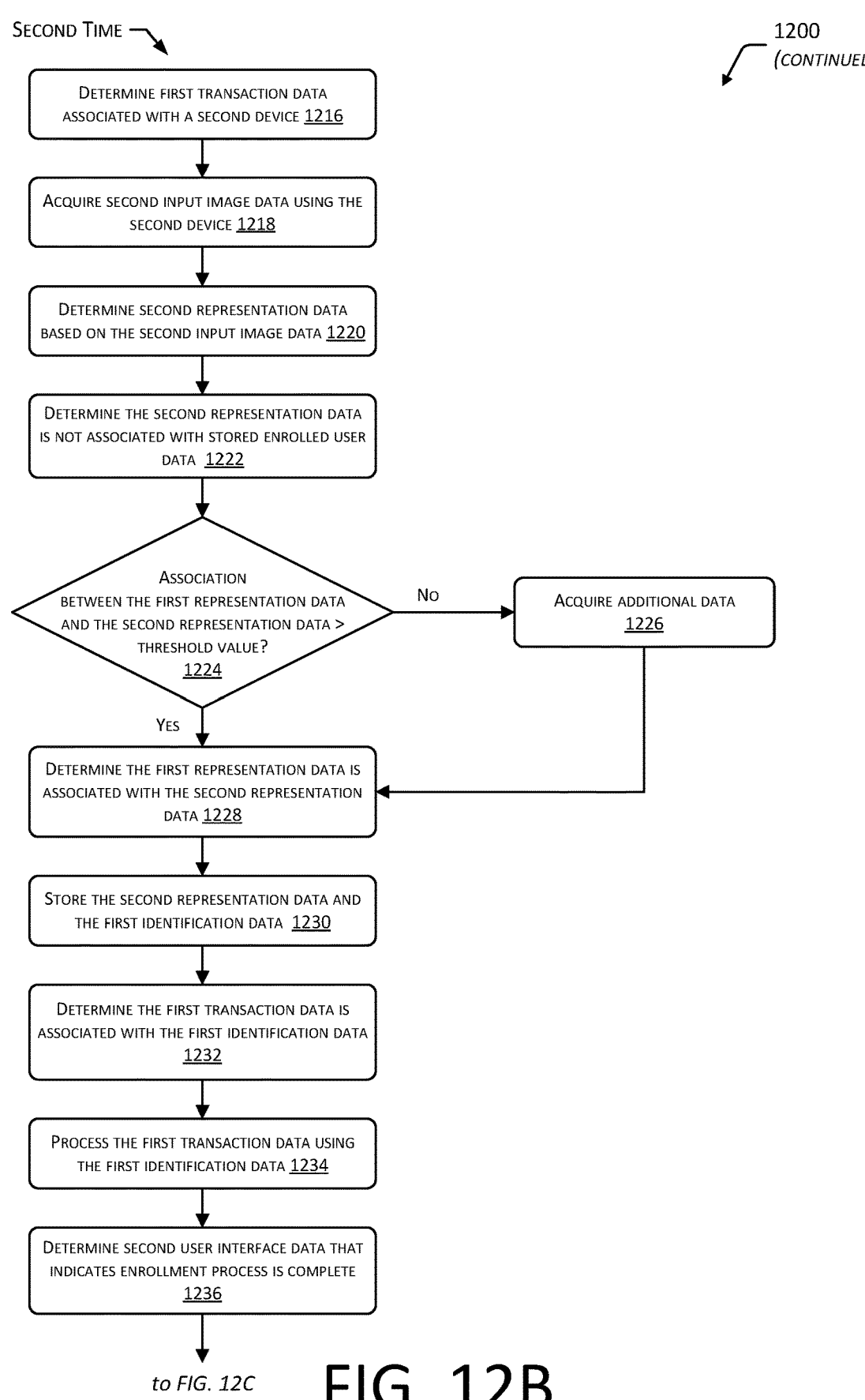

SECOND TIME 1200
(CONTINUED)

DETERMINE FIRST TRANSACTION DATA ASSOCIATED WITH A SECOND DEVICE 1216

ACQUIRE SECOND INPUT IMAGE DATA USING THE SECOND DEVICE 1218

DETERMINE SECOND REPRESENTATION DATA BASED ON THE SECOND INPUT IMAGE DATA 1220

DETERMINE THE SECOND REPRESENTATION DATA IS NOT ASSOCIATED WITH STORED ENROLLED USER DATA 1222

ASSOCIATION BETWEEN THE FIRST REPRESENTATION DATA AND THE SECOND REPRESENTATION DATA > THRESHOLD VALUE? 1224

No

ACQUIRE ADDITIONAL DATA 1226

YES

DETERMINE THE FIRST REPRESENTATION DATA IS ASSOCIATED WITH THE SECOND REPRESENTATION DATA 1228

STORE THE SECOND REPRESENTATION DATA AND THE FIRST IDENTIFICATION DATA 1230

DETERMINE THE FIRST TRANSACTION DATA IS ASSOCIATED WITH THE FIRST IDENTIFICATION DATA 1232

PROCESS THE FIRST TRANSACTION DATA USING THE FIRST IDENTIFICATION DATA 1234

DETERMINE SECOND USER INTERFACE DATA THAT INDICATES ENROLLMENT PROCESS IS COMPLETE 1236 to FIG. 12C       FIG. 12B

THIRD TIME 1200
(CONTINUED)

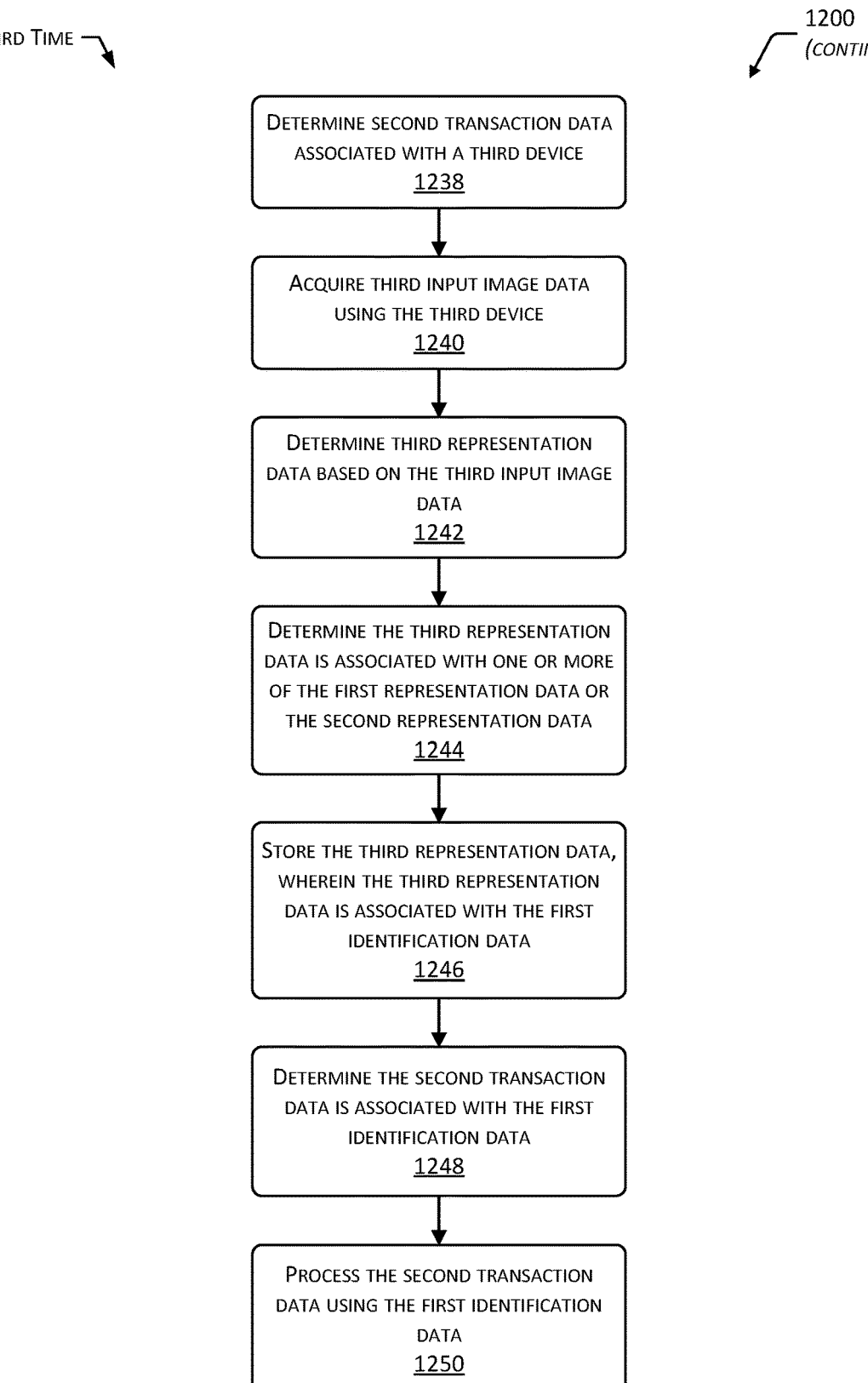

DETERMINE SECOND TRANSACTION DATA ASSOCIATED WITH A THIRD DEVICE
1238

ACQUIRE THIRD INPUT IMAGE DATA USING THE THIRD DEVICE
1240

DETERMINE THIRD REPRESENTATION DATA BASED ON THE THIRD INPUT IMAGE DATA
1242

DETERMINE THE THIRD REPRESENTATION DATA IS ASSOCIATED WITH ONE OR MORE OF THE FIRST REPRESENTATION DATA OR THE SECOND REPRESENTATION DATA
1244

STORE THE THIRD REPRESENTATION DATA, WHEREIN THE THIRD REPRESENTATION DATA IS ASSOCIATED WITH THE FIRST IDENTIFICATION DATA
1246

DETERMINE THE SECOND TRANSACTION DATA IS ASSOCIATED WITH THE FIRST IDENTIFICATION DATA
1248

PROCESS THE SECOND TRANSACTION DATA USING THE FIRST IDENTIFICATION DATA
1250

FIG. 12C

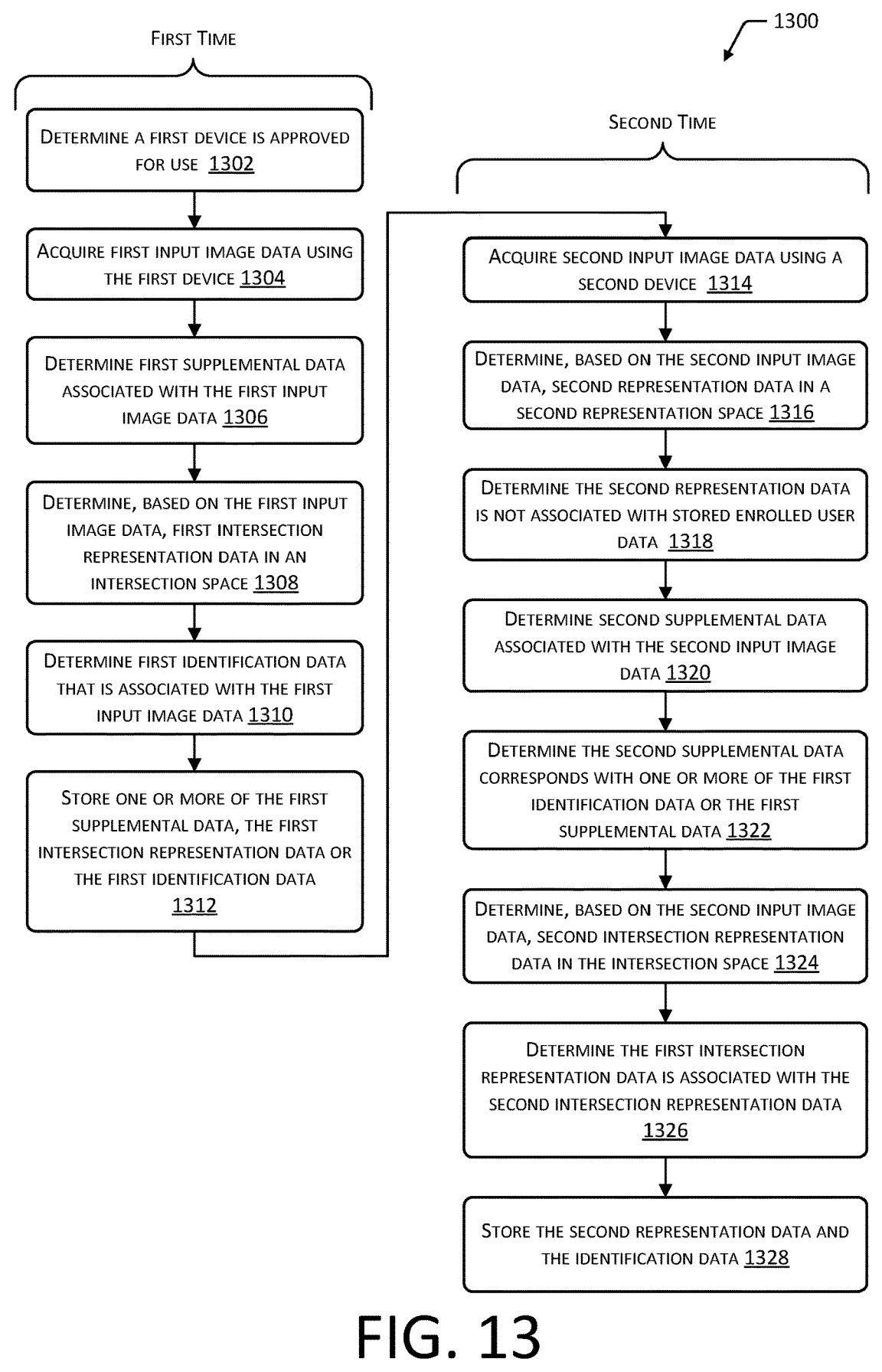

FIRST TIME

1300

SECOND TIME

DETERMINE A FIRST DEVICE IS APPROVED FOR USE 1302

ACQUIRE FIRST INPUT IMAGE DATA USING THE FIRST DEVICE 1304

DETERMINE FIRST SUPPLEMENTAL DATA ASSOCIATED WITH THE FIRST INPUT IMAGE DATA 1306

DETERMINE, BASED ON THE FIRST INPUT IMAGE DATA, FIRST INTERSECTION REPRESENTATION DATA IN AN INTERSECTION SPACE 1308

DETERMINE FIRST IDENTIFICATION DATA THAT IS ASSOCIATED WITH THE FIRST INPUT IMAGE DATA 1310

STORE ONE OR MORE OF THE FIRST SUPPLEMENTAL DATA, THE FIRST INTERSECTION REPRESENTATION DATA OR THE FIRST IDENTIFICATION DATA 1312

ACQUIRE SECOND INPUT IMAGE DATA USING A SECOND DEVICE 1314

DETERMINE, BASED ON THE SECOND INPUT IMAGE DATA, SECOND REPRESENTATION DATA IN A SECOND REPRESENTATION SPACE 1316

DETERMINE THE SECOND REPRESENTATION DATA IS NOT ASSOCIATED WITH STORED ENROLLED USER DATA 1318

DETERMINE SECOND SUPPLEMENTAL DATA ASSOCIATED WITH THE SECOND INPUT IMAGE DATA 1320

DETERMINE THE SECOND SUPPLEMENTAL DATA CORRESPONDS WITH ONE OR MORE OF THE FIRST IDENTIFICATION DATA OR THE FIRST SUPPLEMENTAL DATA 1322

DETERMINE, BASED ON THE SECOND INPUT IMAGE DATA, SECOND INTERSECTION REPRESENTATION DATA IN THE INTERSECTION SPACE 1324

DETERMINE THE FIRST INTERSECTION REPRESENTATION DATA IS ASSOCIATED WITH THE SECOND INTERSECTION REPRESENTATION DATA 1326

STORE THE SECOND REPRESENTATION DATA AND THE IDENTIFICATION DATA 1328

FIG. 13

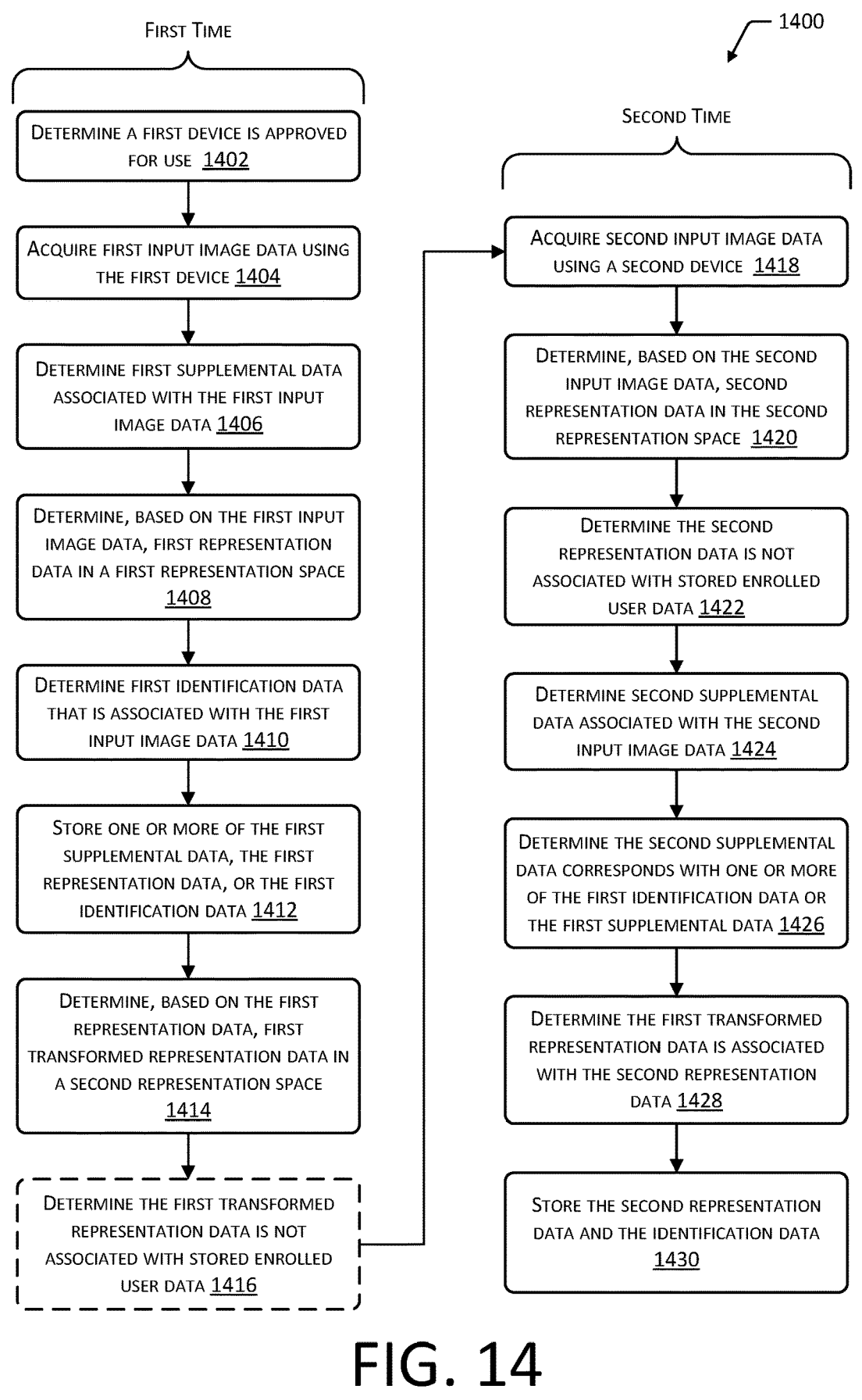

FIRST TIME

1400

SECOND TIME

DETERMINE A FIRST DEVICE IS APPROVED FOR USE 1402

ACQUIRE FIRST INPUT IMAGE DATA USING THE FIRST DEVICE 1404

DETERMINE FIRST SUPPLEMENTAL DATA ASSOCIATED WITH THE FIRST INPUT IMAGE DATA 1406

DETERMINE, BASED ON THE FIRST INPUT IMAGE DATA, FIRST REPRESENTATION DATA IN A FIRST REPRESENTATION SPACE 1408

DETERMINE FIRST IDENTIFICATION DATA THAT IS ASSOCIATED WITH THE FIRST INPUT IMAGE DATA 1410

STORE ONE OR MORE OF THE FIRST SUPPLEMENTAL DATA, THE FIRST REPRESENTATION DATA, OR THE FIRST IDENTIFICATION DATA 1412

DETERMINE, BASED ON THE FIRST REPRESENTATION DATA, FIRST TRANSFORMED REPRESENTATION DATA IN A SECOND REPRESENTATION SPACE 1414

DETERMINE THE FIRST TRANSFORMED REPRESENTATION DATA IS NOT ASSOCIATED WITH STORED ENROLLED USER DATA 1416

ACQUIRE SECOND INPUT IMAGE DATA USING A SECOND DEVICE 1418

DETERMINE, BASED ON THE SECOND INPUT IMAGE DATA, SECOND REPRESENTATION DATA IN THE SECOND REPRESENTATION SPACE 1420

DETERMINE THE SECOND REPRESENTATION DATA IS NOT ASSOCIATED WITH STORED ENROLLED USER DATA 1422

DETERMINE SECOND SUPPLEMENTAL DATA ASSOCIATED WITH THE SECOND INPUT IMAGE DATA 1424

DETERMINE THE SECOND SUPPLEMENTAL DATA CORRESPONDS WITH ONE OR MORE OF THE FIRST IDENTIFICATION DATA OR THE FIRST SUPPLEMENTAL DATA 1426

DETERMINE THE FIRST TRANSFORMED REPRESENTATION DATA IS ASSOCIATED WITH THE SECOND REPRESENTATION DATA 1428

STORE THE SECOND REPRESENTATION DATA AND THE IDENTIFICATION DATA 1430

FIG. 14

SYSTEM FOR BIOMETRIC IDENTIFICATION ENROLLMENT

BACKGROUND

Biometric input data may be used to recognize and assert an identity of a user.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

FIG. 8 illustrates processing training data to determine transformer training data, according to some implementations.

FIG. 11 is a block diagram of a computing device to implement the system, according to some implementations.

FIGS. 12A-C depict a flow diagram of a process to perform a pre-enrollment process, according to some implementations.

FIG. 13 is a flow diagram of a process to perform a pre-enrollment process using an intersection comparison, according to some implementations.

FIG. 14 is a flow diagram of a process to perform a pre-enrollment process using a transform comparison, according to some implementations.

Figure 1:
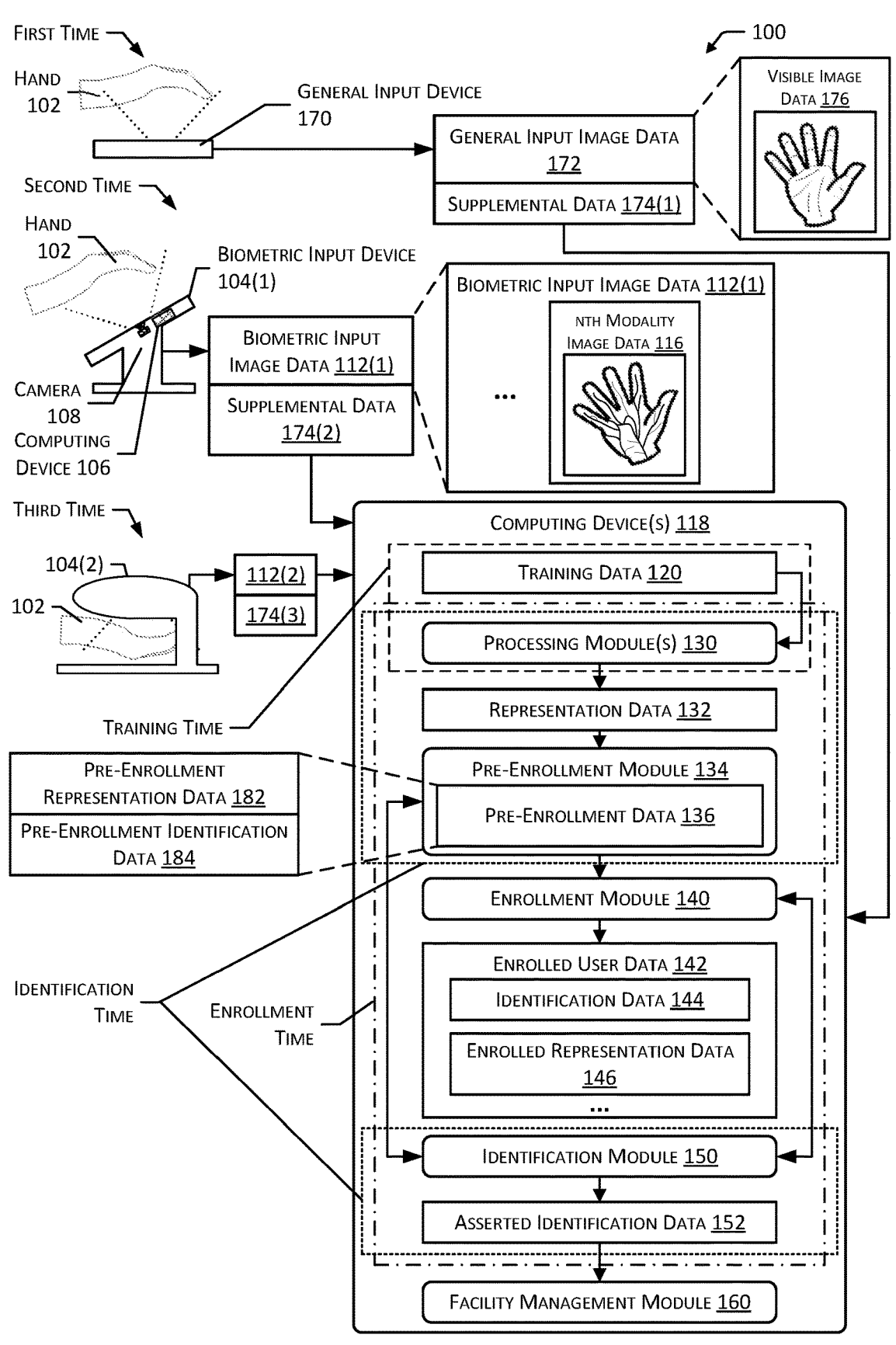
FIG. 1 illustrates a biometric identification system that provides a pre-enrollment process, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Biometric identification offers several advantages in a wide variety of use cases. For example, biometric identification may be used to facilitate payment at a point of sale, to provide access to a facility, and so forth.

Biometric identification may use as input various types of biometric input data. In one implementation the biometric input data may comprise an image of a hand. The biometric input data may be acquired using one or more modalities. For example, a first modality may comprise images of surface skin of a user's palm while a second modality may comprise images of subcutaneous features such as veins of the user's palm. The use of input data that includes two or more modalities provides several advantages for biometric identification. One advantage is the potential for decorrelation between the modalities that may improve overall accuracy. For example, each modality may provide different features, providing more distinct information that may better distinguish one person from another, determine the presence of an artifact such as a realistic-appearing face mask or fake hand, and so forth. While some features may be common across the different modalities, other features vary. For example, the overall shape of the hand may be apparent across modalities, while information such as friction ridges, veins, and so forth may differ between images in the different modalities acquired of the same hand.

During operation a biometric identification system acquires input data using these different modalities. During an enrollment process, a user opts in to participate in using the system. The user may provide identification data, such as their name, account credentials, telephone number, and so forth. The user uses a biometric input device to provide the biometric input data. For example, the user may present their hand to a biometric input device that acquires biometric input image data comprising image data acquired using various modalities. The biometric input image data is processed to determine an enrolled representation that is stored for later use. The identification data is also stored and is associated with the enrolled representation. At a later time, a match of a query representation to the enrolled representation may then be used to assert the identity indicated by the associated identification data.

In addition to the acquisition of the biometric input image data, the biometric input device may include other features such as robust anti-tampering elements, liveness detection hardware to determine if an object being imaged is a live person, and so forth. Deployment of the biometric input devices may be limited to businesses, institutions, or other organizations. In comparison, general input devices such as cellphones, tablet computers, home electronic devices such as smart displays with cameras, and so forth are widely available.

Traditionally the enrollment process for a biometric identification system involves a specific interaction that may be inconvenient to the user. For example, a user may have to go to a specified location that has a biometric input device, submit the identification data, use the biometric input device to acquire biometric input image data, and so forth. In another example, a user may provide their identification data using another device and receive a quick response (QR) code or other token which they then present at the specified location. Continuing the example, this reduces the need to acquire identification data at the specified location, but still requires the presentation and acquisition of the biometric input image data as a separate process. The specified location and the time associated with completing the enrollment process may not be convenient to the user, resulting in an adverse user experience. This may limit use of the system.

Described in this disclosure are techniques and systems for biometric identification enrollment. At a first time, a user utilizes a general input device to start a pre-enrollment process. For example, the general input device may be used to acquire pre-enrollment identification data from the user and general input image data of the user. The general input image data may utilize the same or a different modality during acquisition than the biometric input device. For example, the general input device may have a visible light camera that acquires red-green-blue (RGB) images depicting a hand in visible light. Continuing the example, the biometric input device may have an infrared (IR) camera that acquires infrared images depicting the hand in infrared light.

The general input image data is processed to determine a pre-enrollment representation. The pre-enrollment representation is stored and associated with the pre-enrollment identification data. In some implementations, the pre-enrollment data, or a portion thereof, may expire after a particular time or event. For example, the pre-enrollment representation may be deleted if unused within 10 days.

At a later time, the user presents their hand at the biometric input device. For example, the user may wish to provide payment at a point of sale or be granted access to a facility. The biometric input device acquires biometric input image data that is processed to determine a second representation. The second representation may be compared with previously stored enrolled representation data. If no match is found, the second representation is compared with the pre-enrollment representations.

The pre-enrollment representation data and the representation data associated with the biometric input device may be represented within different embedding spaces. This may be due to the differences in modalities, processing techniques used to determine the representations, and so forth. To perform the comparison between the second representation and the pre-enrollment representation, several techniques may be used.

In one implementation, a trained machine learning network accepts as input the general input image and the biometric input image. A first intersection representation is determined based on the general input image and a second intersection representation is determined based on the biometric input image. The intersection representations are within the same embedding space and may be compared. If the two intersections are less than a threshold distance in the embedding space, they may be deemed to represent the same hand. As a result, the biometric input image may be associated with the general input image. The second representation may then be stored as the enrolled representation, associated with the identification data, and subsequently used for identification.

In another implementation, a trained machine learning network accepts as input the general input image and determines transformed representation data that is within the same embedding space as the second representation. The representations are now within the same embedding space and may be compared. If the two intersections are less than a threshold distance in the embedding space, they may be deemed to represent the same hand. As a result, the biometric input image may be associated with the general input image. The second representation may then be stored as the enrolled representation, associated with the identification data, and subsequently used for identification.

In some situations, during this initial use of the biometric input device, the user may be prompted to provide additional information. For example, they may be asked to enter their telephone number, enter an account name, provide an EMV or other card to be read electronically (or "dipped"), enter data sent to an associated but different device such as code sent to a cellphone, answer an authentication question, and so forth.

By using these techniques and systems, from the user's perspective the interaction associated with the enrollment process is limited to the operations on the general input device. When the pre-enrolled user proceeds to an initial use of the biometric input device, that use results in the acquisition of the biometric input image and other data such as liveness detection, without requiring a separate set of steps or operations for the user. Instead of having the user go to a specified location such as a particular kiosk or customer service area, any participating biometric input device in the biometric identification system may be used by the user to complete the enrollment process with little or no additional effort.

The user experience and utilization of the biometric input device is also improved as the user is also able to utilize the system in an operational capacity during their initial use of the biometric input device. For example, a transaction associated with the user such as a purchase or opening a door, may be completed during that initial use of the biometric input device. From the perspective of the user, they may present their hand and the intended transaction such as the purchase or opening the door is completed.

As mentioned above, in some circumstances during the initial use, the user may be prompted to provide additional information at the biometric input device. This interaction may be minimal and readily performed by the user. For example, users are accustomed to presenting or "dipping" an EMV card at a point of sale. During subsequent uses of the system, the user may simply present their hand to complete the transaction.

Illustrative System

FIG. 1 illustrates a biometric identification system 100 that provides a pre-enrollment process, according to some implementations. The system 100 is described as being used as part of a biometric identification system that determines an identity of a user. However, the system and techniques described herein may be used in other situations.

At a first time, a hand 102 of a user is depicted positioned above a general input device 170. During the first time, the user may perform the pre-enrollment process described below.

The general input device 170 may comprise a cellphone, a tablet computer, home electronic devices such as smart displays, a doorbell security camera, a robot, and so forth. The general input device 170 may include a computing device and a sensor, such as a camera. The general input device 170 is used to acquire general input image data 172 or other input data. The general input image data 172 may comprise visible image data 176 representing a visible light image. The general input image data 172 may comprise a single image, series of images, video data, or other image data. The camera may be configured to acquire an image in a first modality. For example, the camera of a general input device 170 may acquire a red-green-blue (RGB) image using visible light. During operation, as described below in more detail, the general input image data 172 is processed to determine pre-enrollment representation data 182. The general input image data 172 is shown as having a single visible image data 176 for ease of illustration and not necessarily as a limitation. In some implementations the general input image data 172 may comprise other modalities. For example, the general input image data 172 or other input data may comprise LIDAR data of the hand 102, point cloud data of the hand 102, different images acquired while illuminating with different colors of light, data obtained from a fingerprint sensor, and so forth. In another example, the other input data acquired by the general input device 170 may include other types of data, such as audio data comprising speech from the user. In some implementations the other input data may include other images of the user, such as an image of the user's face.

Pre-enrollment identification data 184 may also be determined. The pre-enrollment identification data 184 may comprise one or more of name, account credentials, telephone number, and so forth. In some implementations the pre-enrollment identification data 184 may comprise data acquired during operation of the general input device 170. For example, the user may enter account login credentials to an application executing on the general input device 170. The pre-enrollment identification data 184 may be determined based at least in part on a successful login.

The general input device 170 may also determine supplemental data 174(1). The supplemental data 174(1) may comprise one or more of system metadata or user data. The supplemental data 174 is discussed in more detail with regard to FIG. 2.

At a second time, such as after the user has completed the pre-enrollment process described below, the user may proceed to use one or more biometric input devices 104. The biometric input device 104 may include a computing device 106 and a camera 108. The camera 108 has a field of view (FOV). During operation of the biometric input device 104, the camera 108 acquires images of an object in the FOV using one or more modalities, such as the hand 102, and provides biometric input image data 112(1). The images may comprise single images, a series of images, video data, or other image data. The biometric input device 104 may include other components that are not shown. For example, the biometric input device 104 may include lights that illuminate the object in the FOV, a communication interface, and so forth.

As shown at the second time, the user utilizes the biometric input device 104(1). The hand 102 of the user is depicted positioned above the biometric input device 104(1). In other implementations, other configurations may be used. For example, the camera 108 of the biometric input device 104(2) has the FOV extending downwards, and the user places their hand 102 in the FOV under the biometric input device 104(2).

In some implementations the biometric input device 104 may acquire other input data. For example, the biometric input device 104 may acquire an image of the user's face. In another example the biometric input device 104 may acquire audio data comprising speech from the user.

During operation, the biometric input device 104 may also determine supplemental data 174(2). For example, the supplemental data 174(2) may comprise additional information such as results from liveness detection, data acquired from electronically reading a user-provided EMV card, and so forth.

With the user completing the enrollment process at the second time, at a third time the user may continue to use one or more biometric input devices 104 of the system 100.

In one implementation, the biometric input device 104 is configured to acquire images of the hand 102 that are illuminated using infrared light that has two or more particular polarizations, with different illumination patterns, and so forth. For example, during operation the user may present their hand 102 with the palm or volar region of the hand toward the biometric input device 104. As a result, the biometric input image data 112 provides an image of the anterior portion of the hand 102. In other implementations, the biometric input image data 112 may include the back of the hand 102. Separate images may be acquired using different combinations of polarized light provided by the infrared lights.

Depending upon the polarization used, the images produced by the biometric input device 104 may be of first modality features or second modality features. The first modality may utilize images in which the hand 102 is illuminated with light having a first polarization and obtained by the camera 108 with a polarizer passing light to the camera 108 that also has the first polarization. First modality features may comprise features that are close to, or on, a surface of the hand 102 of the user. For example, the first modality features may include surface features such as creases, wrinkles, scars, dermal papillae ridges, and so forth in at least the epidermis of the hand 102. Images acquired using the first modality may be associated with one or more surface features.

Second modality features comprise those features that are below the epidermis. The second modality may utilize images in which the hand 102 is illuminated with light having a second polarization and obtained by the camera 108 with the polarizer passing light to the camera 108 with the first polarization. For example, the second modality features may include subcutaneous anatomical structures such as veins, bones, soft tissue, and so forth. Some features may be visible in both first modality and second modality images. For example, a crease in the palm may include first modality features on the surface as well as deeper second modality features within the palm. Images acquired using the second modality may be associated with one or more subcutaneous features.

Separate images of the first and second modalities may be acquired using different combinations of polarized light provided by infrared lights. In this illustration, the biometric input image data 112 comprises nth modality image data 116. In some implementations, the biometric input image data 112 may comprise images acquired using a plurality of modalities. For example, the biometric input image data 112 may comprise a first image acquired using a first modality, a second image acquired using a second modality, and so forth. Multiple images of the same object may be acquired in rapid succession with respect to one another. For example, the camera 108 may operate at 60 frames per second and acquire individual frames of nth modality image data 116.

During operation, the general input device 170 may acquire the general input image data 172 using the same or a different modality than that used by the biometric input device 104 to acquire biometric input image data 112. For example, the general input image data 172 may comprise an RGB image of the hand 102 with a first resolution and using lighting from a single source (such as the flash of the general input device 170). Continuing the example, the biometric input image data 112 may comprise an image of the hand 102 with a second resolution and using infrared lighting provided by multiple sources and using differential polarization to image veins and other subcutaneous features. In this example, the general input image data 172 and the biometric input image data 112 are different modalities.

A computing device 118 is shown. One or more computing device(s) 118 may execute one or more of the following modules.

During a "training time" training data 120 is used to train one or more processing module(s) 130 to determine representation data 132. In one implementation, the training data 120 may comprise a plurality of first modality and second modality images that have been labeled. For example, label data may indicate a sample identifier, identity label, modality label, and so forth. The training data 120 is discussed in more detail with regard to FIG. 3.

The processing module(s) 130 may comprise a machine learning network having several different portions. As part of the training, the processing module(s) 130, or portions thereof, determine trained model data that is used to operate the processing modules 130 during inference. The machine learning network and the training process are discussed in more detail with respect to FIGS. 3-5.

Once trained, the processing module(s) 130, or a portion thereof, may be used at inference to process input such as biometric input image data 112 and provide as output the representation data 132. The operation of the trained processing module(s) 130 is discussed in more detail with regard to FIG. 6.

In some implementations, the processing module(s) 130 comprises a machine learning network that includes several portions including one or more backbones, a first embedding portion, an intersection portion, and an XOR portion. The intersection portion facilitates learning to generate representation data that is representative of features present in two or more modalities. The XOR portion facilitates learning to generate representation data representing features that are distinct or exclusive between the input modalities. Some examples of features that are common across two or more modalities are the overall outline of the hand, deep creases in the palm and joints, and so forth. Features such as these would be intersection features that appear in more than one modality. In comparison, a feature that appears in one modality but not in another may be considered distinct or exclusive.

Training and use of this portion of the system 100 is discussed in more detail with regard to FIGS. 3-7 and 13.

In some implementations, the processing module(s) 130 comprises a machine learning network that is trained to accept first representation data associated with a first embedding space and provide transform representation data associated with a second embedding space. Training and use of this portion of the system 100 is discussed in more detail with regard to FIGS. 8-10 and 14.

A pre-enrollment module 134 may be used to determine if second representation data 132 based on the biometric input image data 112 corresponds to first representation data 132 based on the general input image data 172. For example, if the representations are within a common embedding space and are within a threshold distance of one another, they may be deemed to be associated with one another. Operation of the pre-enrollment module 134 is discussed in more detail with regard to FIGS. 7, 10, and 12-14.

During "enrollment time", users are able to utilize the system 100 by performing an enrollment process. The enrollment process may be subdivided into a first time, during which the user performs the pre-enrollment portion of the process using a general input device 170, and a second time during which the enrollment is completed using a biometric input device 104. An enrollment module 140 may coordinate the enrollment process. Enrollment may associate biometric information, such as representation data 132 with particular identification data 144 comprising information such as a name, account number, and so forth.

During the first time of the enrollment process, the user opts in and presents their hand 102 to the general input device 170. The general input device 170 acquires general input image data 172 such as visible image data 176 that is then provided to a computing device 118 executing the trained processing module(s) 130. The trained processing module(s) 130 accepts as input the general input image data 172 and provides as output pre-enrollment representation data 182. The pre-enrollment representation data 182 is representative of at least some of the features depicted in the general input image data 172. In some implementations, the pre-enrollment representation data 182 may comprise one or more vector values in one or more embedding spaces. The pre-enrollment representation data 182 may comprise data associated with one or more intermediate layers or a final layer of the processing module(s) 130. In some implementations, the intermediate layer may comprise an initial input layer.

The pre-enrollment representation data 182 is associated with the pre-enrollment identification data 184 described above. The pre-enrollment identification data 184 is associated with the pre-enrollment representation data 182. For example, both may be acquired using the same general input device 170. In another example, a first general input device 170(1), such as a tablet computer, may be used to acquire a portion of the pre-enrollment identification data 184 while a second general input device 170(2) such as a cellphone is used to acquire a second portion of the pre-enrollment identification data 184.

Pre-enrollment data 136 is stored comprising the pre-enrollment representation data 182 and the pre-enrollment identification data 184. Individual instances of pre-enrollment representation data 182 are associated with respective instances of pre-enrollment identification data 184. The pre-enrollment data 136, or a portion thereof, may expire after one or more of a specified event or time. For example, the pre-enrollment representation data 182 may be deleted if unused for more than a specified number of days. In another example, the pre-enrollment representation data 182 and associated pre-enrollment identification data 184 may be deleted after enrollment is completed. With the pre-enrollment data 136 now available, the system 100 is ready for the user to complete the enrollment process at the second time.

During the second time of the enrollment process, the user presents their hand 102 to the biometric input device 104. The biometric input device 104 provides biometric input image data 112 to a computing device 118 executing the trained processing module(s) 130. The trained processing module(s) 130 accepts as input the biometric input image data 112 and provides as output second representation data 132. The second representation data 132 is representative of at least some of the features depicted in the biometric input image data 112. In some implementations, the second representation data 132 may comprise one or more vector values in one or more embedding spaces. The second representation data 132 may comprise data associated with one or more intermediate layers or a final layer of the processing module(s) 130. In some implementations, the intermediate layer may comprise an initial input layer.

During the enrollment process, the second representation data 132 may be checked using an identification module 150 to determine whether the user has been previously enrolled. A successful enrollment may comprise storage of enrolled user data 142 comprising identification data 144, such as name, telephone number, account number, and so forth and storage of one or more of the representation data 132 or data based thereon as enrolled representation data 146. In some implementations, the enrolled representation data 146 may comprise additional information associated with processing of the biometric input image data 112 with the processing module(s) 130. For example, the enrolled representation data 146 may comprise data associated with one or more intermediate layers of the processing module(s) 130, such as the values of a penultimate layer of one or more portions of the processing module(s) 130.

If the second representation data 132 is deemed to not correspond to a previously enrolled user, the pre-enrollment module 134 determines if the second representation data 132 corresponds to the pre-enrollment representation data 182. The second representation data 132 and the pre-enrollment representation data 182 may be associated with different representation or embedding spaces. As a result, direct comparison of the second representation data 132 and the pre-enrollment representation data 182 may be infeasible. Several implementations are described that may be used to determine a correspondence between the second representation data 132 and the pre-enrollment representation data 182.

The determination as to whether the second representation data 132 corresponds to the pre-enrollment representation data 182 may utilize various techniques. These techniques may include determining a mapping between the representations. In one implementation a processing module 130 that determines intersection features may be used to determine if the second representation data 132 corresponds to the pre-enrollment representation data 182. In another implementation a transformer module may be used to use the pre-enrollment representation data 182 as input to determine transformed representation data that is in the same representation space as the second representation data 132. The transformed representation data may then be compared to the second representation data 132 to determine a correspondence between the two.

If the pre-enrollment module 134 determines that the second representation data 132 is associated with the pre-enrollment representation data 182, the enrollment process may be completed. For example, the pre-enrollment identification data 184 may be stored as the identification data 144 and the second representation data 132 may be stored as the enrolled representation data 146. With enrollment complete, the corresponding pre-enrollment representation data 182 and pre-enrollment identification data 184 may be deleted from the pre-enrollment data 136.

In some implementations other data may be used by the pre-enrollment module 134. In some implementations, other biometric input data 112 such as images of the user's face, audio data representative of the user's speech, and so forth may be used. For example, in addition to comparison of the second representation data 132 and the pre-enrollment representation data 182, a comparison may be made between a first image of the user's face as acquired by the general input device 170 and a second image of the user's face as acquired by the biometric input device 104. In another example, in addition to comparison of the second representation data 132 and the pre-enrollment representation data 182, a comparison may be made between first audio data of the user's speech as acquired by the general input device 170 and second audio data of the user's speech as acquired by the biometric input device 104. In yet another example, the speech and video data may be acquired by both the general input device 170 and the biometric input device 104, and subsequently compared.

In some implementations, the user may be prompted to provide additional information to complete the enrollment process. For example, during the second time the user may be prompted to provide an EMV or other card for electronic readout by the biometric input device 104. In other examples, the user may be asked to enter a code sent to another device such as a cellphone, provide an input using an application executing on another device such as the cellphone, and so forth.

From the point of view of the user, during this initial use of the biometric input device 104 during the second time, minimal or no interaction associated with the enrollment process is experienced. As a result, user convenience is substantially increased. This also reduces the time associated with users enrolling, allowing the biometric input device 104 to be available for non-enrollment use. From the point of view of the system 100, during the second time the second representation data 132 that is provided by the biometric input device 104 is obtained, as well as other information such as confirmation of liveness, authentication information, and so forth.

During "identification time" the (as yet unidentified) user presents their hand 102 at the biometric input device 104. The resulting query biometric input image data 112 may be processed by the (now trained) processing module(s) 130 to determine representation data 132. In some implementations, the computing device 106 may execute a trained processing module(s) 130. The computing device 106 may perform other functions, such as encryption and transmission of the biometric input image data 112 or data based thereon, such as the representation data 132.

The identification module 150 executing on the computing device(s) 118 may accept as input the input representation data 132 associated with the biometric input image data 112 acquired by the biometric input device 104. The input representation data 132 is compared to previously stored data, such as the enrolled representation data 146 to determine asserted identification data 152. In one implementation, the asserted identification data 152 may comprise a user identifier associated with the closest, in the embedding space(s), previously stored enrolled representation data 146 relative to the input representation data 132 associated with the user who presented their hand 102 during identification time. The identification module 150 may utilize other considerations, such as requiring that the query representation data 132 is no more than a maximum distance in the embedding space from the enrolled representation data 146 of a particular user before determining the asserted identification data 152.

The asserted identification data 152 may then be used by subsequent systems or modules. For example, the asserted identification data 152, or information based thereon, may be provided to a facility management module 160.

The facility management module 160 may use the asserted identification data 152 to associate an identity with the user as they move about a facility. For example, the facility management module 160 may use data from cameras or other sensors in the environment to determine a location of the user. Given a known path of the user from an entrance that utilizes the biometric input device 104, the user identity indicated in the identification data 144 may be associated with the user as they use the facility. For example, the now identified user may walk to a shelf, remove an item, and leave the facility. The facility management module 160 may determine the interaction data indicative of the removal of the item as being associated with the user identifier specified in the asserted identification data 152, and bill an account associated with the user identifier. In another implementation, the facility management module 160 may comprise a point of sale system. The user may present their hand 102 at checkout to assert their identity and pay using a payment account that is associated with their identity.

The systems and techniques described above are discussed with respect to images of human hands. These systems and techniques may be used with respect to other forms of data, other kinds of objects, and so forth. For example, these techniques may be used for facial recognition systems, object recognition systems, and so forth.

Figure 2:
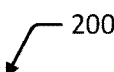
FIG. 2 illustrates supplemental data used by the system, according to some implementations.

FIG. 2 illustrates at 200 supplemental data 174 used by the system 100, according to some implementations. The supplemental data 174 may comprise one or more of system metadata 202 or user data 204. The supplemental data 174 may be associated with or otherwise indicative of operations such as acquisition of the general input image data 172 or other data, the biometric input image data 112, and so forth.

The system metadata 202 comprises information associated with the devices and their respective operation. For example, the system metadata 202 may comprise one or more of a device identifier indicative of a particular device, device geolocation data indicative of a location of the device, timestamp data indicative of date and time, a network address associated with operation of the device, software version used by the device, liveness detection data indicative of whether the input image is associated with a live user or an artifact, and so forth.

The user data 204 comprises information that is associated with a particular user. The user data 204 may be based on input from the user, or may be associated with the user. For example, the user data 204 may comprise a telephone number associated with the user, a payment account number, EMV card data, user account data obtained by an application executing on the device, an authentication code, or other information.

Figure 3:
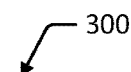
FIG. 3 illustrates training data that is labeled for training of an intersection processing module that may be used for pre-enrollment, according to some implementations.

FIG. 3 illustrates at 300 training data 120 that is labeled for training the processing module(s) 130, according to some implementations. The training data 120 comprises a plurality of images that are representative of a plurality of training identities, 302(1), 302(2), . . . , 302(N). Each training identity 302 is considered to be unique with respect to the other training identities 302.

The information associated with each training identity 302 may comprise actual image data acquired from users who have opted in to provide information for training, synthetic input data that has been generated, or a combination thereof. In one implementation, the training data 120 may exclude individuals who have enrolled to use of the system 100 for identification. For example, enrolled users having identification data 144 may be excluded from inclusion in the training data 120. In another implementation, some enrolled users may opt in to explicitly permit biometric input image data 112 obtained during enrollment to be stored as training data 120.

The synthetic input data may comprise synthetic data that is consistent with expected biometric input image data 112. For example, the synthetic input data may comprise output from a generative adversarial network (GAN) that has been trained to produce synthetic images of a user's hand. In some implementations, the synthetic input data may be based on actual input data. In other implementations, other techniques may be used to determine the synthetic input data.

Each training identity 302(1)-302(N) includes modality image data and associated label data 340. The label data 340 may comprise information such as a sample identifier (ID) 342, modality label 344, and so forth. The sample ID 342 indicates a particular training identity. The sample ID 342 may be used to distinguish one training identity 302 from another. In implementations where actual input data is used as part of the training data 120, the sample ID 342 may be assigned independently of the actual identification data 144 associated with that user. For example, the sample ID 342 may have a value of "User4791" and not the actual identity of "Bob Patel". The modality label 344 indicates whether the associated image data is representative of a first modality, second modality, and so forth.

In this illustration, each training identity 302(1)-302(N) includes general input image data 172(1) and associated sample ID 342(1) and modality label 344(1), and biometric input image data 112(1) and associated sample ID 342(2) and modality label 344(2).

In implementations where additional modalities are used, the training data 120 for a training identity 302 may also include Mth modality image data 306(1) and associated sample ID 342(M) and modality label 344(M).

Figure 4:
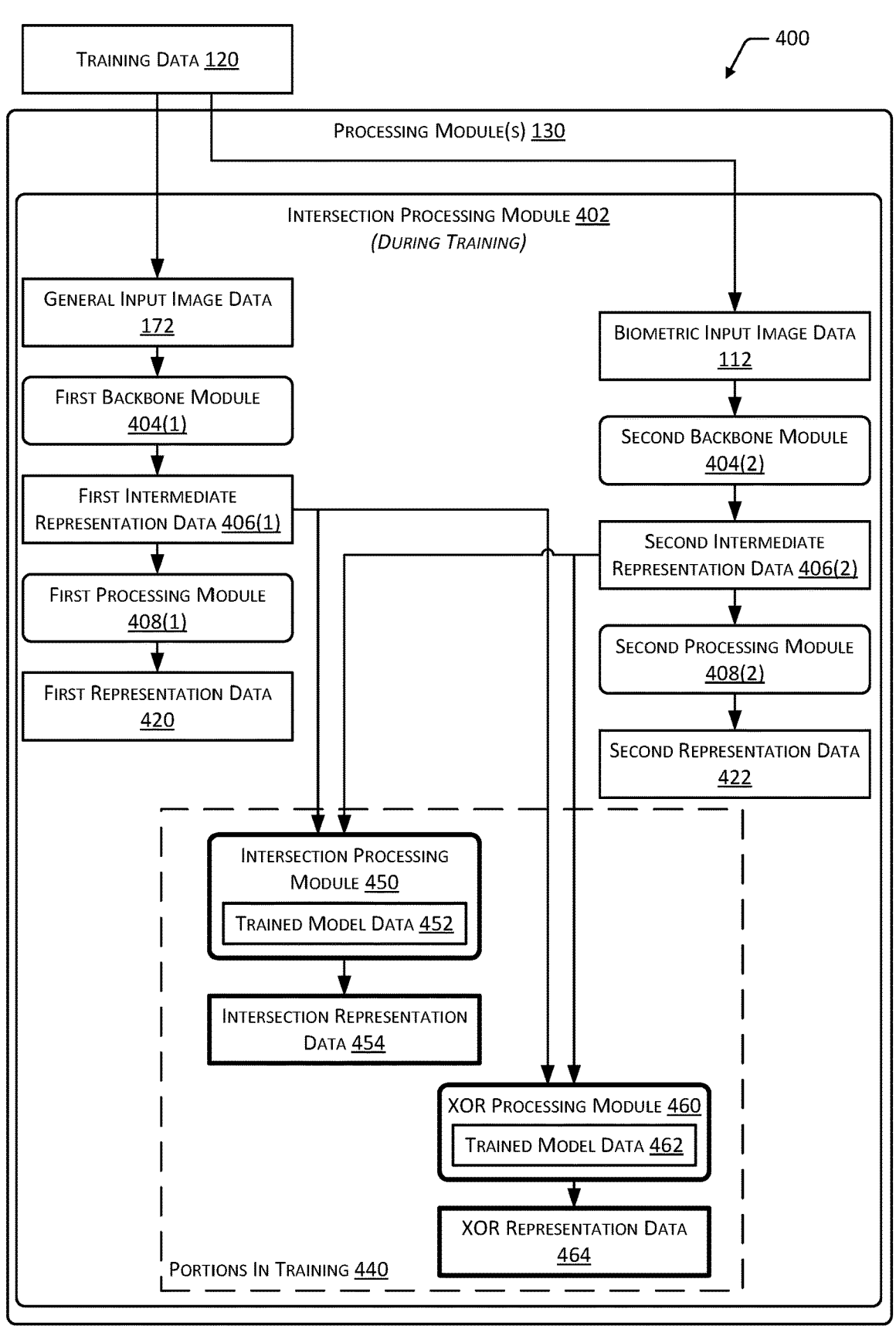
FIG. 4 illustrates, during training, a block diagram of a processing module that includes the intersection processing module, according to some implementations.

FIG. 4 illustrates a block diagram 400 of a processing module(s) 130 that includes an intersection processing module 402 during training, according to some implementations.

During training, the training data 120 is provided as input to the processing module(s) 130. A machine learning network is used to implement the processing module(s) 130. The machine learning network may comprise several portions, or branches. In the implementation depicted, portions in training 440 are being trained as specified and discussed below. The remainder of the portions may have been previously trained for their respective functions. In other implementations, one or more portions of the entire machine learning network may be trained during training.

During training, the processing module(s) 130 may comprise a first backbone module 404(1), a second backbone module 404(2), a first processing module 408(1), an intersection processing module 450 and an XOR processing module 460. In some implementations, during training the processing module(s) 130 may also comprise a second processing module 408(2).

The backbone module(s) 404 comprise a backbone architecture of an artificial neural network. The backbone module 404 accepts as input the training data 120 and produces intermediate representation data 406. In the implementation shown, the first backbone module 404(1) accepts as input the general input image data 172 and provides first intermediate representation data 406(1) as output. Also as shown in FIG. 4, the second backbone module 404(2) accepts as input the biometric input image data 112 and provides second intermediate representation data 406(2) as output. In some implementations, a single backbone module 404 may be used to process the training data 120 and determine intermediate representation data 406. For example, the same backbone module 404 may be used at different times to determine the intermediate representation data 406 for a respective input.

In one implementation the backbone module(s) 404 may utilize a neural network having at least one layer utilizing an inverted residual with a linear bottleneck. For example, MobileNetV2 implements this architecture. (See "Mobile- NetV2: Inverted Residuals and Linear Bottlenecks", Sandler, M. et al, 2018 IEEE/CVF Conference on Computer Vision and Pattern Recognition, 18-23 Jun. 2018.)

The first processing module 408(1) accepts as input the first intermediate representation data 406(1) and determines first representation data 420. For example, the first representation data 420 may be representative of one or more features present in the general input image data 172. The first representation data 420 may comprise data associated with one or more intermediate layers or a final layer of the first processing module 408(1) or other portion of the processing module(s) 130. In implementations where the first backbone module 404(1) accepts as input the general input image data 172, the first representation data 420 may be representative of one or more of surface features.

In some implementations, the network may comprise a multiple head network. For example, different heads may be trained to determine or utilize particular features within the training data 120. For example, the first processing module 408(1) may include or operate in conjunction with another module that provides an additional "head" to determine particular features such as minutiae representing the particular features of friction ridges present on human skin. In another implementation, this portion may be trained to receive and utilize minutiae data determined using another system, such as a minutiae determination algorithm.

The second processing module 408(2) accepts as input the second intermediate representation data 406(2) and determines second representation data 422. For example, the second representation data 442 may be representative of one or more features present in the biometric input image data 112. The second representation data 442 may comprise data associated with one or more intermediate layers or a final layer of the second processing module 408(2) or other portion of the processing module(s) 130. In implementations where the second backbone module 404(2) accepts as input the biometric input image data 112, the second representation data 442 may be representative of one or more of subcutaneous features.

The machine learning network of the processing module(s) 130 includes an intersection branch as implemented by an intersection processing module 450 and an XOR branch as implemented by an XOR processing module 460. In some implementations this provides a joint model training framework. During training, the intersection processing module 450 and the XOR processing module 460 utilize respective loss functions to determine loss values. Based on these loss values, the respective portions determine trained model data. For example, the intersection processing module 450 determines trained model data 452 while the XOR processing module 460 determines trained model data 462. Some implementations of loss functions that may be used are discussed with respect to FIG. 5.

The intersection branch, as implemented by the intersection processing module 450, processes the first intermediate representation data 406(1) and the second intermediate representation data 406(2) to determine intersection representation data 454 and a loss value. For example, the intersection branch is trained such that first modality and second modality images having the same sample ID 342 value belong to the same class. As a result, after training, the intersection representation data 454 is representative of features depicted in a first modality image and a second modality image that are labeled as having a same identity. The intersection representation data 454 may comprise data associated with one or more intermediate layers or a final layer of the intersection processing module 450 or other portion of the processing module(s) 130.

The XOR branch, as implemented by the XOR processing module 460, processes the first intermediate representation data 406(1) and the second intermediate representation data 406(2) to determine XOR representation data 464 for each modality being trained. Each modality of a sample ID 342 may be assigned a different class label for training on the XOR branch. The XOR processing module 460 is trained such that first modality and second modality images with the same sample ID 342 value belong to different classes. As a result, after training, the XOR representation data 464 is representative of features that are depicted in a particular modality and not in the other modalities. For example, the XOR representation data 464 is associated with features that are not in both the first modality image and the second modality image. The XOR representation data 464 may comprise data associated with one or more intermediate layers or a final layer of the XOR processing module 460 or other portion of the processing module(s) 130.

In the implementation shown, there are two modalities in use, resulting in XOR representation data 464 that is associated with the first modality and the second modality. For example, during training, when the first intermediate representation data 406(1) is associated with an input image having a modality label 344 indicating the first modality, the XOR branch determines the first modality XOR representation data 464(1). Continuing the example, when the second intermediate representation data 406(2) is associated with an input image having a modality label 344 indicating the second modality, the XOR branch determines the second modality XOR representation data 464(2).

During training, the loss values determined by the respective loss functions are used to determine the trained model data. For example, trained model data 452 is determined for the intersection processing module 450 while trained model data 462 is determined for the XOR processing module 460.

In some implementations, one or more of the backbone module(s) 404 may be omitted and the input data may be processed by one or more of the processing module(s) 408. For example, the general input image data 172 may be provided as input to the first processing module 408(1), the intersection processing module 450, and the XOR processing module 460. Continuing the example, the biometric input image data 112 may be provided as input to the second processing module 408(2), the intersection processing module 450, and the XOR processing module 460.

Figure 5:
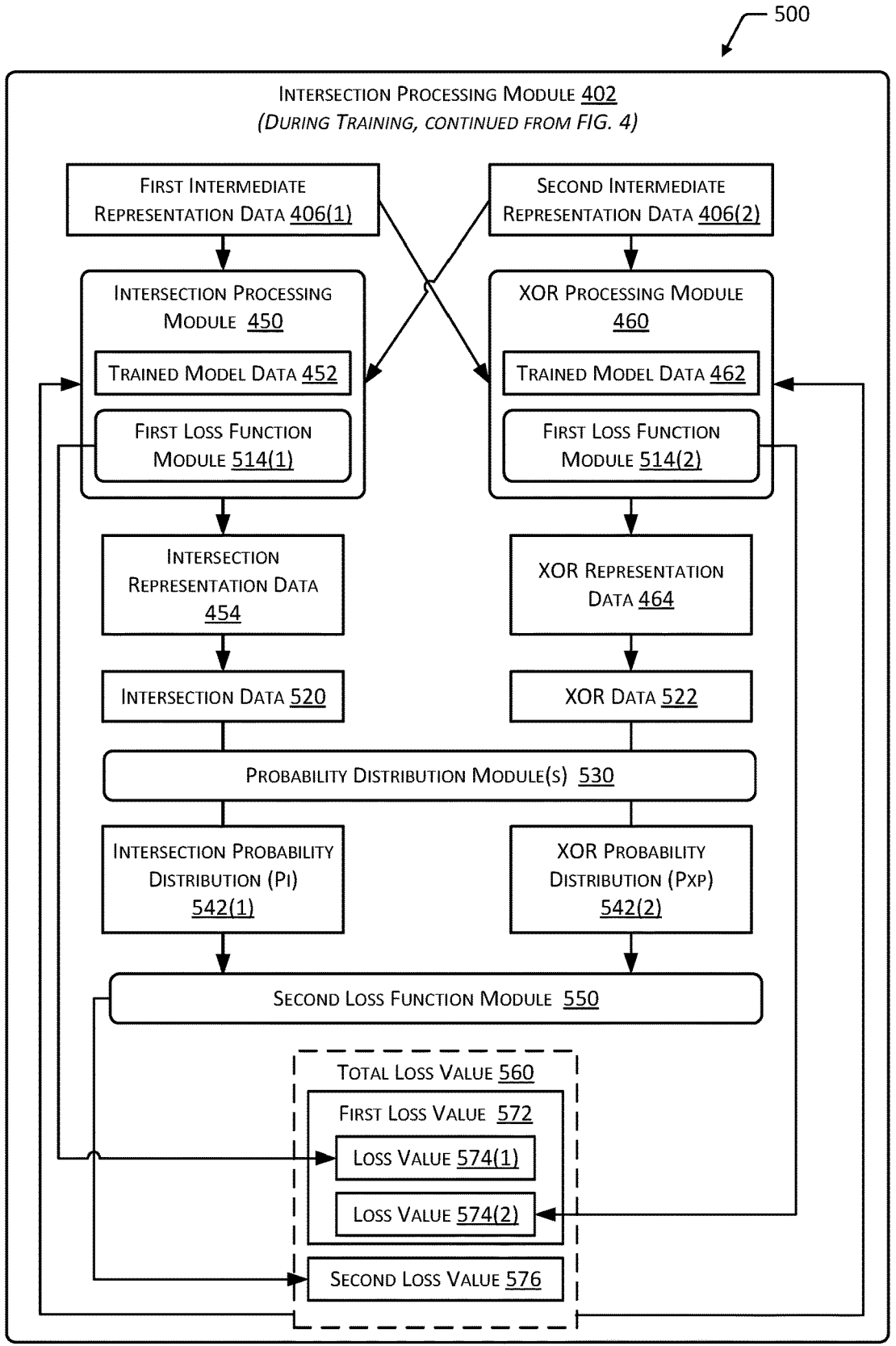
FIG. 5 illustrates a block diagram of loss functions used during training of the intersection processing module, according to some implementations.

FIG. 5 illustrates at 500 a block diagram of the portions in training 440 and their associated loss functions used during training of the processing module(s) 130, according to some implementations. As described with respect to FIG. 4, training may be performed to train the intersection processing module 450 and the XOR processing module 460, with the remaining modules of the processing module(s) 130 not being trained.

The intersection processing module 450 includes a first loss function module 514(1). The XOR processing module 460 includes another first loss function module 514(2). The first loss function modules 514(1) and 514(2) determine loss values 574. The branches utilize the label data 340 during training. The loss values 574 may also be provided to the second loss function module 550.

In one implementation, the first loss function module 514 may utilize a hyperspherical loss function as shown with regard to equations 1 and 2. In other implementations, other loss functions may be used. For example, other functions such as Softmax, Cosine, AM-Softmax, Arcface, large margin cosine loss, and so forth may be used.

The hyperspherical loss (HSL) function minimizes L which is the sum of a cross-entropy term, and a regularization term to regularize the confidence score (weighted by λ). $W_j$ denotes a classifier weight for $j^{th}$ class. C is the total number of training classes. M is the minibatch size. In these equations m is a fixed angular margin. $\hat{W}$ and $\hat{x}$ are the unit-normalized form of W and x respectively. Also in these equations, $x_i$ (embedding vector of input i) and $s_i$ are both outputs of the respective modules such as the intersection processing module 450 and the XOR processing module 460, where $s_i$ is used only during training.

$$L = -\frac{1}{M}\sum_{i=1}^{M}\left(\log p_i - \lambda s_i^2\right) \qquad \text{(Equation 1)}$$

$$p_i = \frac{e^{S_i\left(\hat{W}_{y_i}^T\hat{x}_i - m\right)}}{e^{S_i\left(\hat{W}_{y_i}^T\hat{x}_i - m\right)} + \sum_{j=1, j\neq y_i}^{C} e^{\hat{W}_j^T\hat{x}_i}} \qquad \text{(Equation 2)}$$

$$p_i = \frac{e^{S_i\left(\hat{W}_{y_i}^T\hat{x}_i - m\right)}}{e^{S_i\left(\hat{W}_{y_i}^T\hat{x}_i - m\right)} + \sum_{j=1, j\neq y_i}^{C} e^{\hat{W}_j^T\hat{x}_i}}$$

During training, the intersection processing module 450 may determine the intersection representation data 454, one or more parameters of the intersection representation data 454, and so forth. For example, the one or more parameters may comprise weights for one or more classes. The intersection representation data 454 and associated one or more parameters may be stored as intersection data 520. During training, the XOR processing module 460 may determine a plurality of the first modality XOR representation data 464(1) and the second modality XOR representation data 464(2), and one or more parameters of the XOR representation data 464. The XOR representation data 464 and associated one or more parameters may be stored as XOR data 522. Once training is complete, one or more of the intersection data 520 or XOR data 522 may be deleted or otherwise discarded.

A probability distribution module 530 processes the data 520-522 to determine a set of probability distributions. The intersection data 520 is processed to determine an intersection probability distribution (Pi) 542(1). The XOR data 522 is processed to determine an XOR probability distribution (Pxp) 542(2).

A second loss function module 550 accepts the probability distributions 542 and determines a second loss value 576. In one implementation, the second loss function module 550 may implement a Jensen-Shannon Divergence (JSD) loss function. The JSD loss function measures similarity between two probability distributions. For two probability distributions 542 P and Q, JSD may be defined in one implementation with the following equation:

$$JSD(P\|Q) = 0.5*(D)P\|M) + D(Q\|M)) \qquad \text{(Equation 3)}$$

where M=(P+Q)/2, D is the Kullback-Leibler Divergence (KLD).

Unlike KLD, JSD(P∥Q)=JSD(Q∥P), which allows JSD to be used as a distance metric for probability distributions. It is desired that the values of the probability distributions 542 of incorrect classes for the intersection (I) and XOR (Xp) have values that differ from one another, implicitly ensuring decorrelation.

Given an image x for identity c, the joint model training framework described above and using a first loss function such as hyperspherical loss, determines the set of probability distributions 542: the intersection probability distribution (Pi) 542(1) and the XOR probability distribution (Pxp) 542(2). For example, the loss values 574 determined by the first loss function module(s) 514 may be used as input to the JSD loss function. These probability distributions are N dimensional, where N is the number of training identities 302(N). This can be expressed with the following equations:

$$Pi = [\text{pi\_1, pi\_2, ... , pi\_N}] \qquad \text{(Equation 4)}$$

$$Pxp = [\text{pxp\_1, pxp\_2, ... , pxp\_N}] \qquad \text{(Equation 5)}$$

From each of these probability distributions 542, the entry corresponding to the correct identity c is removed, and the vector is normalized to get (N-1) dimensional probability distribution of incorrect classes Pi_n, Pxp_n, as shown in the following equations:

$$\text{pi\_n} = [\text{pi\_1, pi\_2, ... ,} \qquad \text{(Equation 6)}$$
$$\text{pi\_c} - 1, \text{pi\_c} + 1, ... , \text{pi\_N}]/(1 - \text{pi\_c})$$

$$\text{Pxp\_n} = [\text{pxp\_1, pxp\_2, ... ,} \qquad \text{(Equation 7)}$$
$$\text{pxp\_c} - 1, \text{pxp\_c} + 1, ... , \text{pxp\_N}]/(1 - \text{pxp\_c})$$

$$\text{Pxp\_n} = [\text{pxp\_1, pxp\_2, ... ,}$$
$$\text{pxp\_c} - 1, \text{pxp\_c} + 1, ... \text{pxp\_N}]/(1 - \text{pxp\_c})$$

The JSD loss then minimizes the following equation:

$$\text{JSD\_Loss} = -1.0*(JSD(\text{Pi\_n} \| \text{Pxp\_n})) \qquad \text{(Equation 8)}$$

$$\text{JSD\_Loss} = -1.0*(JSD(\text{Pi\_n} \| \text{Pxp\_n}))$$

A total loss value 560 is calculated based on the first loss values 572 and the second loss value 576. For example, the total loss value 560 may be calculated using the following equation:

$$\text{Total Loss} = \text{Hyperspherical\_loss} + \text{loss\_weight} * \text{JSP\_loss} \qquad \text{(Equation 9)}$$

$$\text{Total Loss} = \text{Hyperspherical\_loss} + \text{loss\_weight} * \text{JSD\_loss}$$

The total loss value 560 may then be provided to the one or more of the intersection processing module 450 or the XOR processing module 460 for subsequent iterations during training. As a result of training, the trained model data 452 and 462, respectively, is determined. For example, the trained model data may comprise weight values, bias values, threshold values, and so forth that are associated with particular nodes or functions within the processing module(s) 130. Once trained, the processing module(s) 130 may be used to determine representation data 132 for subsequent use.

Figure 6:
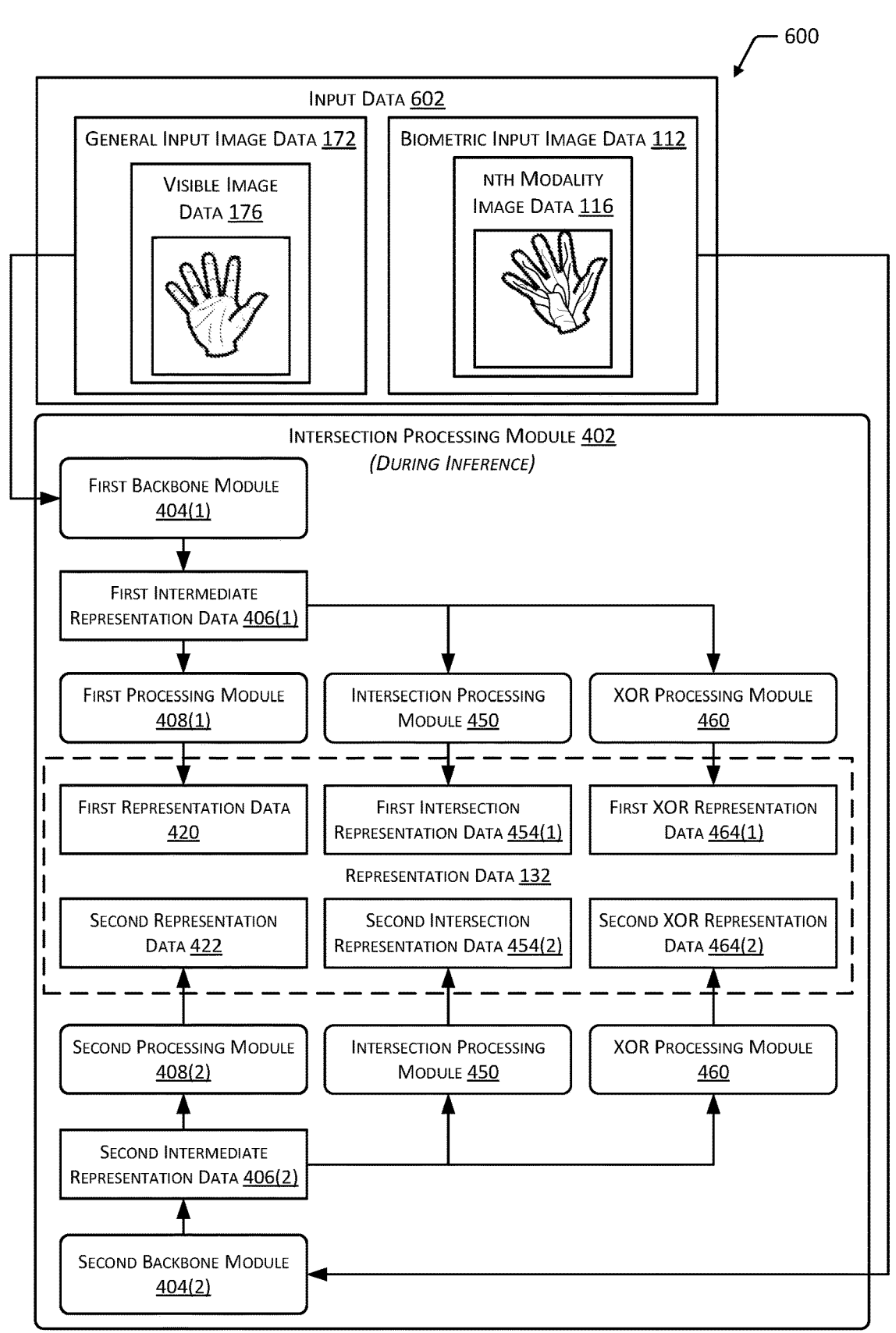
FIG. 6 illustrates a block diagram of the intersection processing module during inference, according to some implementations.

FIG. 6 illustrates at 600 a block diagram of the processing module(s) 130 during inference, according to some implementations.

Once the portions in training 440 have been trained as described above, during inference a subset of the machine learning network may be used. In the implementation depicted here, the intersection processing module 402 during inference may comprise the first backbone module 404(1), the first processing module 408(1), the second backbone module 404(2), the second processing module 408(2), and the intersection processing module 450. During operation, input data 602 such as general input image data 172 comprising visible image data 176 and biometric input image data 112 comprising nth modality image data 116 is provided to the trained processing module(s) 130.

The first backbone module 404(1) may process the general input image data 172 to determine the first intermediate representation data 406(1). The first intermediate representation data 406(1) is processed by the first processing module 408(1) to determine the first representation data 420. The first intermediate representation data 406(1) is processed by the intersection processing module 450 to determine the first intersection representation data 454(1).

In some implementations, the first intermediate representation data 406(1) may be processed by the XOR processing module 460 to determine the first XOR representation data 464(1).

The second backbone module 404(2) may process the biometric input image data 112 to determine the second intermediate representation data 406(2). The second intermediate representation data 406(2) is processed by the second processing module 408(2) to determine the second representation data 422. The second intermediate representation data 406(2) is processed by the intersection processing module 450 to determine the second intersection representation data 454(2).

In some implementations, the second intermediate representation data 406(2) may be processed by the XOR processing module 460 to determine the second XOR representation data 464(2).

The representation data 132 may comprise one or more of the first representation data 420, the second representation data 422, the first intersection representation data 454(1), the second intersection representation data 454(2), the first XOR representation data 464(1), or the second XOR representation data 464(2). The resulting representation data 132 may be used in subsequent processes, such as to determine if the general input image data 172 and the biometric input image data 112 are matched or mismatched, enrollment, identification, and so forth. The representation data 132 may comprise data associated with one or more intermediate layers or a final layer of the processing module(s) 130.

In some implementations, one or more of the backbone module(s) 404 may be omitted and the input data 602 may be processed by one or more of the processing module(s) 408. For example, the general input image data 172 may be provided as input to the first processing module 408(1), the intersection processing module 450, and the XOR processing module 460. Continuing the example, the biometric input image data 112 may be provided as input to the second processing module 408(2), the intersection processing module 450, and the XOR processing module 460.

In addition to those mentioned above, once trained, a deployed implementation of the processing module(s) 130 may omit one or more other modules that are used during training and not during inference. For example, the processing module(s) 130 may omit the first loss function modules

514, the probability distribution module 530, the second loss function module 550, and so forth.

Figure 7:
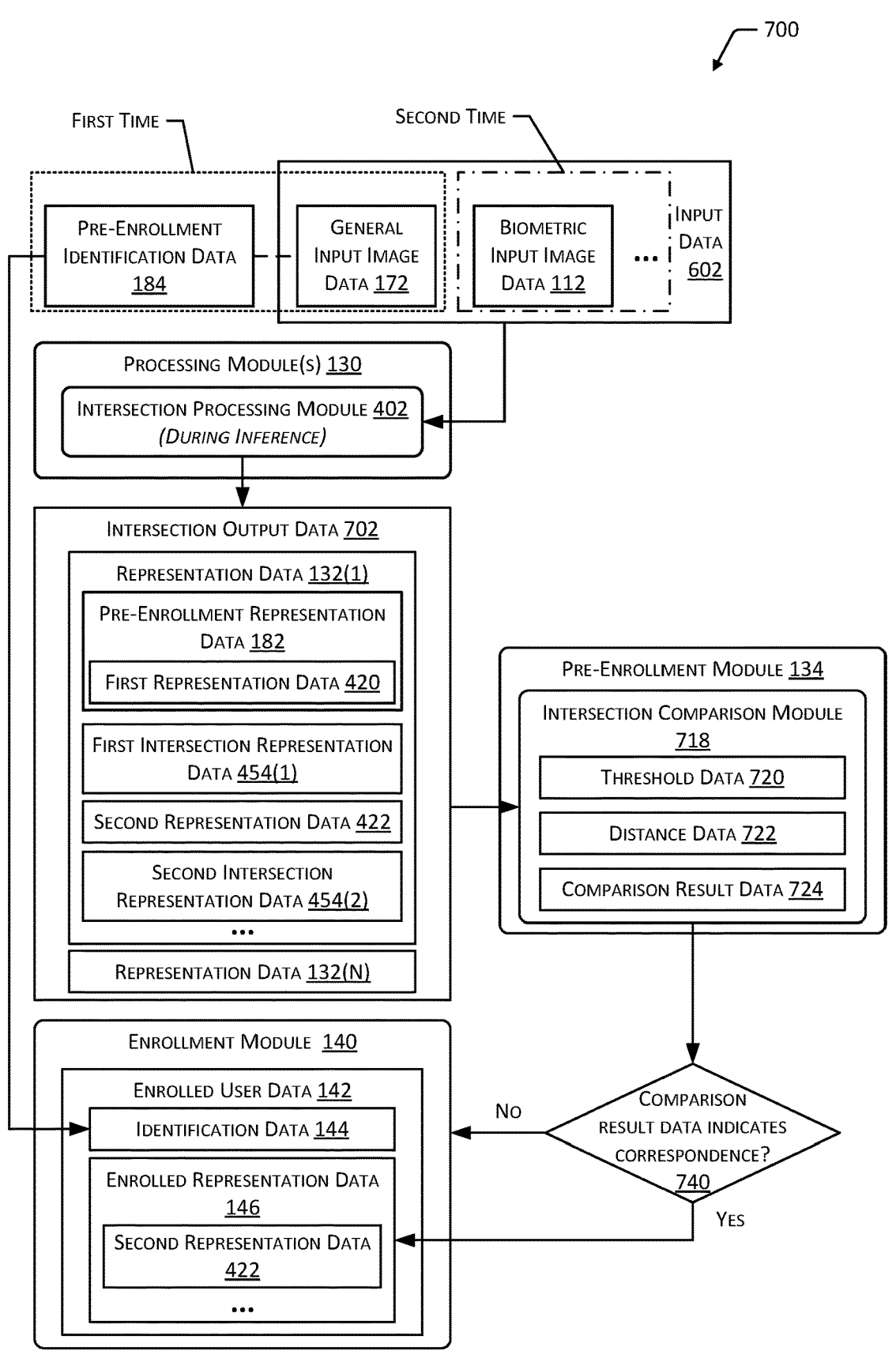
FIG. 7 is a block diagram of an intersection comparison module that may be used for pre-enrollment, according to some implementations.

FIG. 7 is a block diagram 700 of an intersection comparison module that may be used for pre-enrollment, according to some implementations. As described above, the modalities associated with the general input image data 172 and the biometric input image data 112 may differ. In some implementations, the modalities may be the same, but different processing modules 130 may be used to process the general input image data 172 and the biometric input image data 112 to determine the respective pre-enrollment representation data 182 and the second representation data 132. In one implementation, the trained intersection processing module 402 may be used to determine a correspondence between the general input image data 172 and the biometric input image data 112.

In this illustration, input data 602 comprises the general input image data 172 acquired during the first time and the biometric input image data 112 acquired during the second time. The pre-enrollment identification data 184 may also be acquired during the first time and is associated with the general input image data 172.

In some implementations, a plurality of instances of image data may be acquired. For example, the input data 602 may comprise ten pairs of general input image data 172 and biometric input image data 112 that have been acquired from a user who has opted in to use of the system 100.

The input data 602 is processed by the intersection processing module 402 as described above, such as with regard to FIG. 6.

Intersection output data 702 may comprise one or more of instances of representation data 132(1)-(N), each instance comprising the first representation data 420 (stored as the pre-enrollment representation data 182), the first intersection representation data 454(1), the second representation data 422, or the second intersection representation data 454(2).

The intersection output data 702, or a portion thereof, may be processed by the pre-enrollment module 134. In the implementation shown here, the pre-enrollment module 134 comprises an intersection comparison module 718. The intersection comparison module 718 is configured to accept as input the first intersection representation data 454(1) and the second intersection representation data 454(2) and determine comparison result data 724. The intersection representation data 454 associated with one or more instances of representation data 132(1)-(N) in the intersection output data 702 may be provided to the intersection comparison module 718. In some implementations, the intersection comparison module 718 may compare each instance of first intersection representation data 454(1) with each instance of second intersection representation data 454(2). Continuing the earlier example, if ten pairs of biometric input image data 112(1)-(10) and general input image data 172(1)-(10) are processed, up to 10×10 or 100 comparisons may be performed. Comparison result data 724 may be determined for each comparison. Continuing the example, the comparison result data 724 may comprise a set of 100 values, each associated with a particular pair.

In one implementation shown here, the intersection comparison module 718 may determine distance data 722 indicative of a distance in an intersection embedding space between a given combination of the first intersection representation data 454(1) and the second intersection representation data 454(2). For example, the distance data 722 may be calculated as a cosine distance between the first intersection representation data 454(1) and the second intersection representation data 454(2). The distance data 722 may be compared to a first threshold value specified by threshold data 720 to determine the comparison result data 724. For example, if the distance data 722 indicates a distance that is less than the first threshold value, the general input image data 172 and the biometric input image data 112 may be deemed to correspond to a same hand 102. In another example, if the distance data 722 indicates a distance that is greater than or equal to the threshold value, the general input image data 172 and the biometric input image data 112 may be deemed to not correspond or correspond to different hands 102.

In some implementations, the intersection comparison module 718 may include a classifier or other machine learning system that may be trained to accept the first intersection representation data 454(1) and the second intersection representation data 454(2) as input and provide as output comparison result data 724 indicative of a classification of "{inputs_correspond}" or "{no_correspondence}". In some implementations, the classifier may also be trained using one or more of the first representation data 420, the second representation data 422, the XOR representation data 464(1) or 464(2), and so forth. In some implementations the threshold data 720 may specify one or more thresholds associated with operation of the classifier. For example, the threshold data 720 may specify a minimum confidence value to be used to provide output.

At 740 the comparison result data 724 is assessed. If at 740 the comparison result data 724 indicates the general input image data 172 and the biometric input image data 112 correspond to one another, the process may proceed to complete enrollment by storing the second representation data 422 or other information based on the biometric input image data 112 as the enrolled representation data 146, and storing the pre-enrollment identification data 184 that is associated with the general input image data 172 as the identification data 144 associated with the enrolled representation data 146.

If at 740 the general input image data 172 and the biometric input image data 112 are deemed to not correspond to one another, the process may proceed to begin the enrollment process. For example, the user may be prompted to opt in to use the system, may be presented with a user interface to provide identification data 144, and so forth.

During operation of the system 100, the second representation data 422 that is based on the biometric input image data 112 may be processed by the identification module 150 to determine if the user has previously been enrolled. For clarity of illustration, and not as a limitation, this comparison is not depicted in FIG. 7. If the biometric input image data 112 is not determined to correspond to a previously enrolled user, the operations associated with the pre-enrollment module 134 may be performed to complete the enrollment. If the user is determined to have been previously enrolled, the operations described with regard to this figure may be omitted.

FIG. 8 illustrates at 800 a method of processing training input data to determine transformer training data 850, according to some implementations. The preparation of transformer training data 850 may be implemented by one or more computing devices 118. Transformer training data 850 is acquired for use in training a transformer module 902 as described with respect to FIG. 9.

Training data 120, as described above, is shown. The training data 120 may comprise one or more of general input image data 172 and biometric input image data 112 with associated label data 340 or synthetic input data with associated label data 340.

The training data 120 is processed by at least two processing models 808. The general input image data 172 such as the visible image data 176 is processed by the first processing module 808(1) to determine first training representation data 820(1) in a first embedding space 822(1). In some implementations, the first training representation data 820(1) comprises, or is based on, intermediate layer data 810 and embedding layer data 812. The intermediate layer data 810 may comprise values associated with one or more layers of the first processing module 808(1) while processing input. The embedding layer data 812 comprises the representation data 132 that is provided by output of the first processing module 808(1). In one implementation, the intermediate layer data 810 may comprise values of a penultimate layer of a neural network of the first processing module 808(1). The penultimate layer may comprise the layer preceding the final output of the embedding layer data 812. In one implementation, the intermediate layer data 810 may comprise the values of a fully connected linear layer that precedes the output of the embedding layer data 812. For example, the embedding layer data 812 may have a vector of size 128, while the intermediate layer data 810 has a vector of size of 1280.

Continuing the implementation discussed above, the first training representation data 820(1) may comprise a concatenation of the intermediate layer data 810 and the embedding layer data 812. In other implementations, the intermediate layer data 810 and the embedding layer data 812 may be otherwise combined.

In some implementations, use of the intermediate layer data 810 results in a substantial improvement in overall performance of the system 100.

The biometric input image data 112 such as the nth modality image data 116 is processed by the second processing module 808(2) to determine second training representation data 820(2) in a second embedding space 822(2). This pair of training representation data 820(1) and 820(2) may be associated with one another by a common value of sample ID 342. This pair is thus representative of the same input data, from the training data 120, as expressed in two different embedding spaces. Each instance of training representation data 820 may have associated with label data 856. This associated label data 856 may comprise the modality label 344 and a model label 858 that is indicative of the processing module 808 used to generate the particular training representation data 820.

In some implementations, the second training representation data 820(2) comprises, or is based on, intermediate layer data 814 and embedding layer data 816. The intermediate layer data 814 may comprise values associated with one or more layers of the second processing module 808(2) while processing input. The embedding layer data 816 comprises the representation data 132 that is provided by output of the second processing module 808(2). In one implementation, the intermediate layer data 814 may comprise values of a penultimate layer of a neural network of the second processing module 808(2). The penultimate layer may comprise the layer preceding the final output of the embedding layer data 816. In one implementation, the intermediate layer data 814 may comprise the values of a fully connected linear layer that precedes the output of the embedding layer data 816. For example, the embedding layer data 816 may have a vector of size 128, while the intermediate layer data 814 has a vector of size of 1280.

Continuing the implementation discussed above, the second training representation data 820(2) may comprise a concatenation of the intermediate layer data 814 and the embedding layer data 816. In other implementations, the intermediate layer data 814 and the embedding layer data 816 may be otherwise combined.

In some implementations, use of the intermediate layer data 814 results in a substantial improvement in overall performance of the system 100.

The transformer training data 850, comprising first training representation data 820(1), second training representation data 820(2), and associated or implied label data 856 may be used to train a transformer module 902, as described next.

Figure 9:
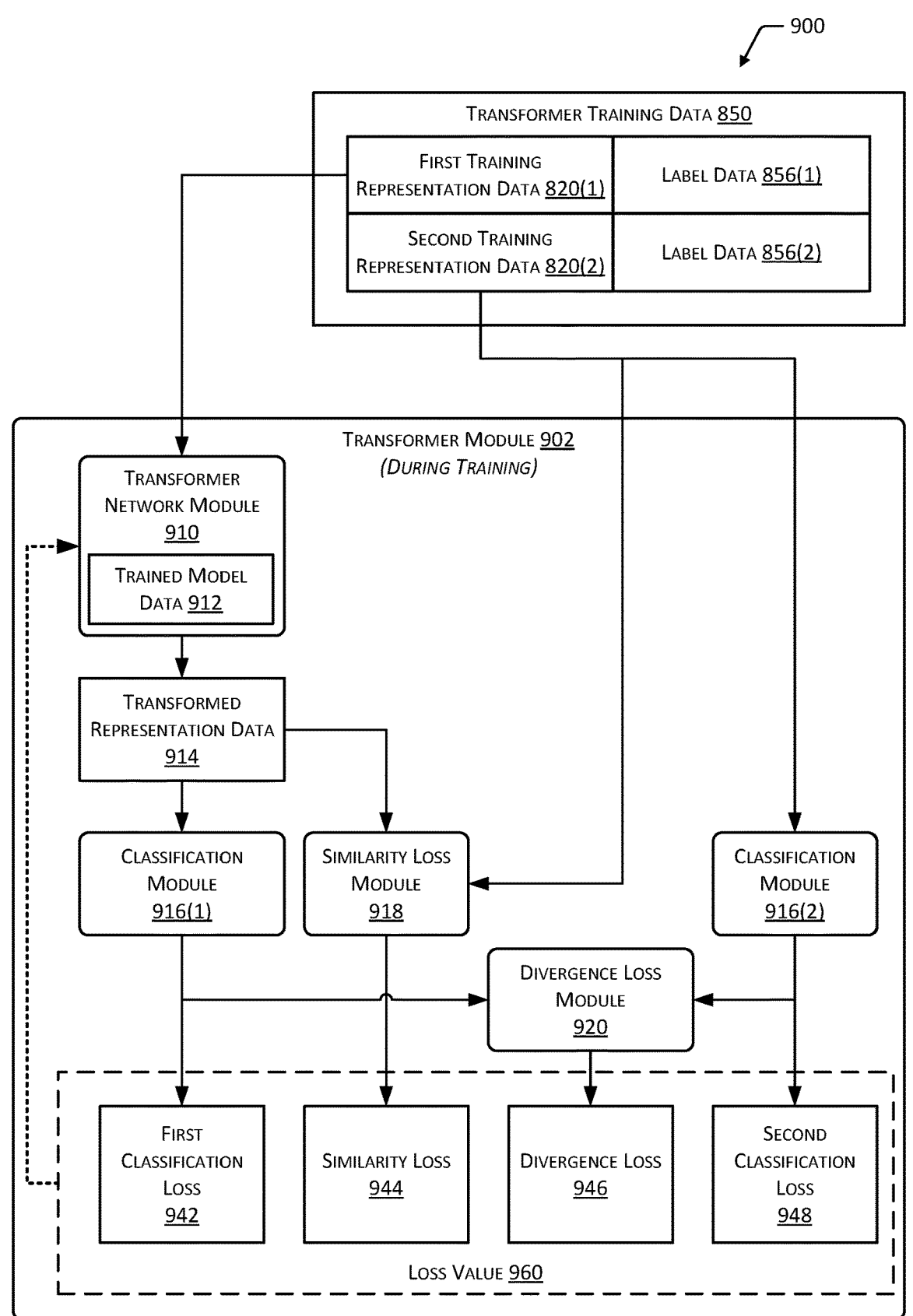
FIG. 9 illustrates a transformer module during training, according to some implementations.

FIG. 9 illustrates at 900 a transformer module 902 during training, according to some implementations. The transformer module 902 may be implemented by one or more computing devices 118. The transformer module 902 comprises a transformer network module 910, classification modules 916, similarity loss module 918, and a divergence loss module 920.

The transformer network module 910 may comprise a neural network. During training, the transformer network module 910 accepts as input first training representation data 820(1), associated with a first embedding space 822, and produces as output transformed representation data 914. As training progresses, the quality of the resulting transformed representation data 914 may be expected to improve due to the loss values 960 that are returned as described below.

In some implementations the transformer network module 910 may comprise one or more multilayer perceptrons (MLP). Trained model data 912 associated with operation of the transformer network module 910 is determined during training. For example, the trained model data 912 may comprise one or more of weight values, bias values, and so forth associated with operation of portions of the neural network.

The transformed representation data 914 is processed by a first classification module 916(1) to determine a first classification loss 942. In one implementation, the classification module 916 may utilize a HyperSpherical loss function as shown with regard to equations 1 and 2. In other implementations, other classification loss functions may be used. For example, other classification functions such as Softmax, Cosine, AM-Softmax, Arcface, large margin cosine loss, and so forth may be used.

The HyperSpherical Loss (HSL) function may also be used during training of the processing module(s) 130. The HSL loss minimizes L which is the sum of a cross-entropy term, and a regularization term to regularize the confidence score (weighted by λ). $W_j$ denotes a classifier weight for $j^{th}$ class. C is the total number of training classes. M is the minibatch size. In these equations m is a fixed angular margin. $\hat{W}$ and $\hat{x}$ are the unit-normalized form of W and x respectively. Also in these equations $x_i$ (embedding vector of input l) and $s_i$ are both outputs of the processing module 408, where $s_i$ is used only during training.

$$L = -\frac{1}{M}\sum\nolimits_{i=1}^{M}\left(\log p_i - \lambda s_i^2\right) \qquad \text{(Equation 1)}$$

$$p_i = \frac{e^{s_i\left(\hat{W}_{y_i}^T \hat{x}_i - m\right)}}{e^{s_i\left(\hat{W}_{y_i}^T \hat{x}_i - m\right)} + \sum\nolimits_{j=1, j \neq y_i}^{C} e^{\hat{W}_j^T \hat{x}_i}} \qquad \text{(Equation 2)}$$

$$p_i = \frac{e^{s_i\left(\hat{W}_{y_i}^T \hat{x}_i - m\right)}}{e^{s_i\left(\hat{W}_{y_i}^T \hat{x}_i - m\right)} + \sum\nolimits_{j=1, j \neq y_i}^{C} e^{\hat{W}_j^T \hat{x}_i}}$$

The second training representation data 820(2) is processed by a second classification module 916(2) to determine a second classification loss 948. The second classification module 916(2) may utilize the same loss function as the first classification module 916(1). For example, the second classification module 916(2) may utilize the Hyper-Spherical loss function.

The similarity loss module 918 accepts as input the transformed representation data 914 and the second training representation data 820(2) and determines a similarity loss 944.

In one implementation, the similarity loss module 918 may implement a mean squared error (MSE) and cosine distance loss function. In other implementations, other loss functions may be used. For example, an MSE loss may be used.

The divergence loss module 920 accepts as input the first classification loss 942 and the second classification loss 948 and determines a divergence loss 946. In one implementation, the divergence loss module 920 may implement a Kullback-Leibler divergence (KLD) function.

Loss value(s) 960 comprising one or more of the first classification loss 942, the second classification loss 948, the similarity loss 944, or the divergence loss 946 are then provided back to the transformer network module 910 for subsequent iterations during training.

In some implementations the transformer network module 910 may implement a cycle consistency loss function. (See "Unpaired Image-to-Image Translation Using Cycle-Consistent Adversarial Networks", Zhu, Jun-Yan. et al, arXiv: 1703.01593v7, 24 Aug. 2020.) The cycle consistency loss function may be used to minimize the distance between the first training representation data 820(1) and the transformed representation data 914. In one implementation this may result in training a first portion of the transformer network module 910 to transform the first representation data 420 into the transformed representation data 914, and a second portion of the transformer network module 910 to transform the transformed representation data 914 into third representation data. The first representation data 420 and the third representation data are expressed with a common representation space, such as the same embedding space. For example, during training the transformer network module 910 may be trained to accept an input print image as input, generate a vein image from the print image, and generate a second print image from the vein image. The input print image may then be compared with the second print image, and the transformer network module 910 trained to minimize the distance between these.

Figure 10:
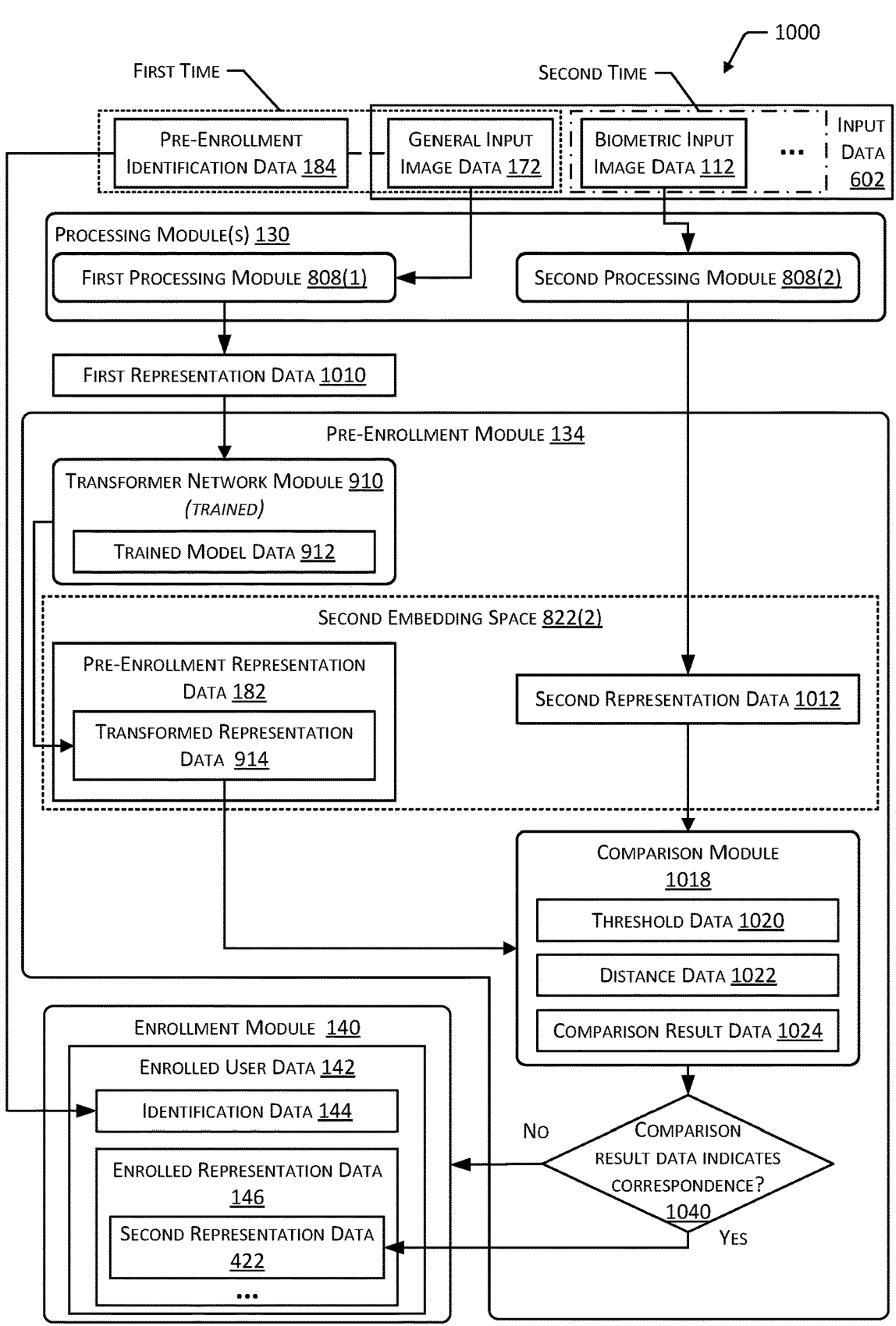
FIG. 10 is a block diagram of using a transformer and a comparison module for pre-enrollment, according to some implementations.

FIG. 10 is a block diagram 1000 of using a transformer and a comparison module for pre-enrollment, according to some implementations.

As described above, the modalities associated with the general input image data 172 and the biometric input image data 112 may differ. In some implementations, the modalities may be the same, but different processing modules 130 may be used to process the general input image data 172 and the biometric input image data 112 to determine the respective pre-enrollment representation data 182 and the second representation data 132. In one implementation, a correspondence between the general input image data 172 and the biometric input image data 112 may be determined by transforming one or more of the representation data 132 into a common representation space. For example, the pre-enrollment representation data 182 may be transformed into transformed representation data 914 that is in the same representation space as the second representation data 132, allowing comparison between the two.

In this illustration, input data 602 comprises the general input image data 172 acquired during the first time and the biometric input image data 112 acquired during the second time. The pre-enrollment identification data 184 may also be acquired during the first time and is associated with the general input image data 172. As described with regard to FIG. 7, in some implementations, a plurality of instances of image data may be acquired. For example, the input data 602 may comprise ten pairs of general input image data 172 and biometric input image data 112 that have been acquired from a user who has opted in to use of the system 100.

The pre-enrollment module 134 may comprise the trained transformer network module 910. As mentioned above, in some implementations the transformer network module 910 may implement a cycle consistency loss function during training.

During operation, the pre-enrollment module 134 accepts as input first representation data 1010 and second representation data 1012. For example, the general input image data 172 may be processed by the first processing module 808(1) to determine the first representation data 1010 and biometric input image data 112 may be processed by the second processing module 808(2) to determine the second representation data 1012. In other implementations, other processing modules 130 may be used to determine the first representation data 1010 and the second representation data 1012. For example, the intersection processing module 402 may be used.

The transformer network module 910 accepts the first representation data 1010 as input and, based on the trained model data 912, determines as output transformed representation data 914. The transformed representation data 914 is in the same second embedding space 822(2) as the second representation data 1012. The transformed representation data 914 may be stored or otherwise used as the pre-enrollment representation data 182.

A comparison module 1018 accepts as input the transformed representation data 914 and the second representation data 1012 and determines comparison result data 1024.

In the implementation shown here, the comparison module 1018 may determine distance data 1022 indicative of a distance in the second embedding space 822(2) between the transformed representation data 914 and the second representation data 1012. For example, the distance data 1022 may be calculated as a cosine distance between the transformed representation data 914 and the second representation data 1012. The distance data 1022 may be compared to a threshold value specified by threshold data 1020 to determine the comparison result data 1024. For example, if the distance data 1022 indicates a distance that is less than a threshold value, the input data 602 may be deemed to correspond in that the biometric input image data 112 is associated with the general input image data 172. In another example, if the distance data 1022 indicates a distance that is greater than or equal to the threshold value, the input data 602 may be deemed to not correspond in that the biometric input image data 112 and the general input image data 172 are deemed to be associated with different hands 102.

In another implementation the comparison module 1018 may include a classifier or other machine learning system that may be trained to accept the transformed representation data 914 and the second representation data 1012 as input and provide comparison result data 1024 indicative of a classification of "{inputs_correspond}" or "{no_correspondence}". In some implementations, the classifier may also be trained using one or more of the transformed representation data 914, the first representation data 1010, the second representation data 1012, the intersection representation data 454, the XOR representation data 464, and so forth.

In some implementations (not shown) the comparison module 1018 may, instead of or in addition to the above, perform a comparison between the first representation data 1010 and second transformed representation data 914(2). The second transformed representation data 914(2) may be determined by using a second transformer network module 910(2). The second transformer network module 910(2) accepts the second representation data 1012 as input and, based on trained model data 912(2), determines as output second transformed representation data 914(2). The second transformed representation data 914(2) is in the same first embedding space 822(1) as the first representation data 1010.

Implementations using additional modalities may include additional representations, transformer network modules 910, and comparisons of the transformed representation data 914 produced thereby.

At 1040 the comparison result data 1024 is assessed. If at 1040 the comparison result data 1024 indicates the general input image data 172 and the biometric input image data 112 correspond to one another, the process may proceed to complete enrollment by storing the second representation data 1012 or other information based on the biometric input image data 112 as the enrolled representation data 146, and storing the pre-enrollment identification data 184 that is associated with the general input image data 172 as the identification data 144 associated with the enrolled representation data 146.

If at 1040 the general input image data 172 and the biometric input image data 112 are deemed to not correspond to one another, the process may proceed to begin the enrollment process. For example, the user may be prompted to opt in to use the system, may be presented with a user interface to provide identification data 144, and so forth.

During operation of the system 100, the second representation data 1012 that is based on the biometric input image data 112 may be processed by the identification module 150 to determine if the user has previously been enrolled. For clarity of illustration, and not as a limitation, this comparison is not depicted in FIG. 10. If the biometric input image data 112 is not determined to correspond to a previously enrolled user, the operations associated with the pre-enrollment module 134 may be performed to complete the enrollment. If the user is determined to have been previously enrolled, the operations described with regard to this figure may be omitted.

FIG. 11 is a block diagram 1100 of a computing device 118 to implement the system 100, according to some implementations. The computing device 118 may be within the biometric input device 104, may comprise a server, and so forth. The computing device 118 may be physically present at the facility, may be accessible by a network, or a combination of both. The computing device 118 does not require end-user knowledge of the physical location and configuration of the system that delivers the services. Common expressions associated with the computing device 118 may include "embedded system", "on-demand computing", "software as a service (Saas)", "platform computing", "network-accessible platform", "cloud services", "data centers", and so forth. Services provided by the computing device 118 may be distributed across one or more physical or virtual devices.

One or more power supplies 1102 may be configured to provide electrical power suitable for operating the components in the computing device 118. The one or more power supplies 1102 may comprise batteries, capacitors, fuel cells, photovoltaic cells, wireless power receivers, conductive couplings suitable for attachment to a power source such as provided by an electric utility, and so forth. The computing device 118 may include one or more hardware processors 1104 (processors) configured to execute one or more stored instructions. The processors 1104 may comprise one or more cores. One or more clocks 1106 may provide information indicative of date, time, ticks, and so forth. For example, the processor 1104 may use data from the clock 1106 to associate a particular interaction with a particular point in time.

The computing device 118 may include one or more communication interfaces 1108 such as input/output (I/O) interfaces 1110, network interfaces 1112, and so forth. The communication interfaces 1108 enable the computing device 118, or components thereof, to communicate with other devices or components. The communication interfaces 1108 may include one or more I/O interfaces 1110. The I/O interfaces 1110 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 1110 may couple to one or more I/O devices 1114. The I/O devices 1114 may include input devices such as one or more of a sensor 1116, keyboard, mouse, scanner, and so forth. The I/O devices 1114 may also include output devices 1118 such as one or more of a display device, printer, audio speakers, and so forth. In some embodiments, the I/O devices 1114 may be physically incorporated with the computing device 118 or may be externally placed. The sensors 1116 may comprise the camera 108, smartcard readers, touch sensors, microphones, and so forth.

The network interfaces 1112 may be configured to provide communications between the computing device 118 and other devices, such as routers, access points, and so forth. The network interfaces 1112 may include devices configured to couple to personal area networks (PANs), local area networks (LANs), wireless local area networks (WLANS), wide area networks (WANs), and so forth. For example, the network interfaces 1112 may include devices compatible with Ethernet, Wi-Fi, Bluetooth, and so forth.

The computing device 118 may also include one or more buses or other internal communications hardware or software that allow for the transfer of data between the various modules and components of the computing device 118.

As shown in FIG. 11, the computing device 118 includes one or more memories 1120. The memory 1120 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 1120 provides storage of computer-readable instructions, data structures, program modules, and other data for the operation of the computing device 118. Several functional modules are shown stored in the memory 1120, although the same functionality may alternatively be implemented in hardware, firmware, or as a system on a chip (SoC).

The memory 1120 may include at least one operating system (OS) module 1122. The OS module 1122 is configured to manage hardware resource devices such as the I/O interfaces 1110, the I/O devices 1114, the communication interfaces 1108, and provide various services to applications or modules executing on the processors 1104. The OS module 1122 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Washington, USA; and so forth.

A communication module 1126 may be configured to establish communications with the computing device 118, servers, other computing devices 106, or other devices. The communications may be authenticated, encrypted, and so forth.

The processing module(s) 130 may be stored in the memory 1120.

The pre-enrollment module 134 may be stored in the memory 1120. In some implementations the pre-enrollment module 134 may comprise one or more of the intersection comparison module 718, the transformer network module 910, the pre-enrollment module 134, or the comparison module 1018.

The enrollment module 140 may be stored in the memory 1120.

The identification module 150 may be stored in the memory 1120.

The facility management module 160 may be stored in the memory 1120.

Also stored in the memory 1120 may be a data store 1124 and one or more of the following modules. These modules may be executed as foreground applications, background tasks, daemons, and so forth. The data store 1124 may use a flat file, database, linked list, tree, executable code, script, or other data structure to store information. In some implementations, the data store 1124 or a portion of the data store 1124 may be distributed across one or more other devices including other computing devices 106, network attached storage devices, and so forth.

The data store 1124 may store the training data 120, transformer training data 850, and so forth. The data store 1124 may store the trained model data 1134 such as the trained model data 452, the trained model data 462, and the trained model data 912. The data store 1124 may store enrolled user data 142.

In some implementations, one or more of the general input image data 172 or the biometric input image data 112 may be temporarily stored during processing by the processing module(s) 130 or other modules. For example, the biometric input device 104 may acquire the biometric input image data 112, determine representation data 132 based on the biometric input image data 112, and then erase the biometric input image data 112. The resulting representation data 132 may then be sent to a server or other computing device 118 to perform enrollment, for comparison to assert an identity, and so forth.

The facility management module 160 may perform various functions, such as tracking items between different inventory locations, to and from carts, generating restocking orders, directing operation of robots within the facility, using the asserted identification data 152 to associate a particular user identity with a user in the facility, and so forth. During operation, the facility management module 160 may access sensor data 1132 such as biometric input image data 112, or data from other sensors 1116.

Information used by the facility management module 160 may be stored in the data store 1124. For example, the data store 1124 may be used to store physical layout data 1130, sensor data 1132, asserted identification data 152, user location data 1136, interaction data 1138, and so forth. For example, the sensor data 1132 may comprise the biometric input image data 112 obtained from a biometric input device 104 associated with the facility.

The physical layout data 1130 may provide information indicative of where biometric input devices 104, cameras, weight sensors, antennas for radio receivers, inventory locations, and so forth are within the facility with respect to one another. For example, the physical layout data 1130 may comprise information representative of a map or floor plan of the facility with relative positions of gates with biometric input devices 104 and inventory locations.

The facility management module 160 may generate the user location data 1136 that is indicative of the location of the user within the facility. For example, the facility management module 160 may use image data obtained by the cameras to determine a location of the user. In other implementations, other techniques may be used for determining the user location data 1136. For example, data from a smart floor may be used to determine the location of the user.

The identification data 144 may be associated with user location data 1136. For example, the user enters the facility and has their hand 102 scanned by the biometric input device 104, resulting in asserted identification data 152 that is associated with their time of entry and the biometric input device 104 location. The user location data 1136 indicative of a path of a user that begins at the biometric input device 104 location at the time of entry may be associated with the user identifier in the asserted identification data 152.

Based on the user location data 1136 and the interaction data 1138, a particular interaction may be associated with an account of a particular user. For example, if the user location data 1136 indicates that the user is present in front of inventory location 1192 at time 09:02:02 and the interaction data 1138 indicates a pick of a quantity of one item from an area on inventory location 1192 at 09:04:13, the user may be billed for that pick.

The facility management module 160 may use the sensor data 1132 to generate the interaction data 1138. The interaction data 1138 may include information about the type of item involved, quantity involved, whether the interaction was a pick or place, and so forth. Interactions may include the user picking an item from an inventory location, placing an item at the inventory location, touching an item at the inventory location, rummaging through items at the inventory location, and so forth. For example, the facility management module 160 may generate interaction data 1138 that indicates what item the user picked from a particular lane on a shelf, and then use this interaction data 1138 to adjust the count of inventory stowed at that lane. The interaction data 1138 may then be used to bill an account associated with the user identifier that is associated with the user who picked the item.

The facility management module 160 may process the sensor data 1132 and generate output data. For example, based on the interaction data 1138, a quantity of a type of item at a particular inventory location may drop below a threshold restocking level. The system may generate output data comprising a restocking order indicative of the inventory location, the area, and a quantity needed to replenish stock to a predetermined level. The restocking order may then be used to direct a robot to restock that inventory location.

Other modules 1140 may also be present in the memory 1120 as well as other data 1142 in the data store 1124. For example, a billing module may use the interaction data 1138 and the asserted identification data 152 to bill an account associated with a particular user.

FIGS. 12A, 12B, and 12C depict a flow diagram 1200 of a process to perform a pre-enrollment process, according to some implementations. The process may be implemented by one or more computing devices of the system 100, such as a computing device of the general input device 170, the computing device 106 of the biometric input device 104, the computing devices 118, or other devices.

The user opts in to use the system. The following process may then be initiated following the opt-in by the user.

The operations shown in FIG. 12A with respect to 1202 through 1214 may be associated with a first time.

At 1202 first input image data is acquired using a first device. For example, the general input device 170 may be used to acquire the general input image data 172 at a first time.

At 1204 first representation data 132(1) is determined based on the first input image data. For example, the general input image data 172 may be processed by one or more of the processing modules 130 to determine the first representation data 132(1). In some implementations the first representation data 132(1), or data based thereon, may be stored as the pre-enrollment representation data 182.

At 1206 the first representation data 132(1) is determined to not be associated with stored enrolled user data 142. For example, if the enrolled representation data 146 includes first representation data 132 that was previously stored, the identification module 150 may accept as input the first representation data 132(1) and return data indicative of no corresponding enrolled representation data 146. In other implementations the first representation data 132(1) may be processed as described herein to determine if there is an association between the first representation data 132(1) and previously stored enrolled representation data 146.

At 1208 first identification data is determined. For example, pre-enrollment identification data 184 may be received from the general input device 170, retrieved from storage, and so forth.

In some implementations, at 1210 the first identification data is deemed to not be associated with stored identification data 144 in the enrolled user data 142. For example, the first identification data may comprise user data 204 such as a legal name, telephone number, account identifier, and so forth. The identification data 144 may be searched to determine if the first identification data is already present within the enrolled user data 142. If yes, the user may be presented with a prompt in a user interface that indicates they are already enrolled. If no, the process may proceed to 1212.

At 1212 the first identification data and the first representation data are stored. For example, the pre-enrollment identification data 184 and the pre-enrollment representation data 182 are stored for use at the second time.

In some implementations, at 1214 first user interface data may be determined that indicates the user may proceed to use the system. The first user interface data may then be used to cause an output to the user. For example, the first user interface data may comprise text that may be presented to the user via an output device such as a display device.

The operations shown in FIG. 12B with respect to 1216 through 1236 may be associated with a second time.

In some implementations, at 1216 first transaction data associated with a second device is determined. The transaction data may be indicative of a purchase, request for physical access, authorization to perform a function, and so forth. For example, the transaction data may comprise a request to charge a payment account for a retail purchase. As described above, with the pre-enrollment process complete at the first time, the initial use of a biometric input device 104 may involve processing of transaction data. As a result, the initial use may complete the enrollment process while also completing a transaction.

At 1218 second input image data is acquired using the second device. For example, the biometric input device 104 may be used to acquire the biometric input image data 112 at the second time.

At 1220 second representation data 132(2) is determined based on the second input image data. For example, the biometric input image data 112 may be processed by one or more of the processing modules 130 to determine the second representation data 132(2).

At 1222 the second representation data 132(2) is determined to not be associated with stored enrolled user data 142. For example, the identification module 150 may accept as input the second representation data 132(2) and return data indicative of no corresponding enrolled representation data 146.

At 1224 a determination may be made as to whether an association between the first representation data 132(1) and the second representation data 132(2) is greater than a threshold value. For example, the correspondence between the first representation data 132(1) and the second representation data 132(2) may be expressed as a confidence value that is compared to the threshold value. If the association is less than or equal to the threshold value, the process proceeds to 1226.

At 1226 additional data may be acquired. For example, the additional data may comprise user data 204. In some implementations the second device may be used to acquire the additional data. For example, the biometric input device 104(1) may prompt the user to present an EMV card for reading by a reader of the biometric input device 104(1), may prompt the user to enter an authentication code, may prompt the user to enter a telephone number, and so forth. In other implementations, the additional data may be acquired using another device, such as providing information on a device such as a cellular telephone that is associated with the pre-enrollment identification data 184. In some implementations, the additional data may comprise audio data such as of the user speaking, image data such as of the user's face, and so forth. The additional data may be assessed and if deemed to correspond to the information associated with the pre-enrollment identification data 184, the process proceeds to 1228. If not, an error message may be presented.

If the association between the first representation data 132(1) and the second representation data 132(2) is greater than the threshold value, then the process proceeds to 1228. At 1228 the first representation data 132(1) is determined to be associated with the second representation data 132(2). For example, the intersection output data 702 may be determined and processed to determine the comparison result data 724 that indicates the first representation data 132(1) is associated with the second representation data 132(2).

At 1230 the second representation data 132(2) and the first identification data are stored. For example, the second representation data 132(2) may be stored as the enrolled representation data 146, and at least a portion of the pre-enrollment identification data 184 or data based thereon may be stored as the identification data 144. Also stored is an association between the particular enrolled representation data 146 and the particular identification data 144.

With the enrollment process complete, the associated pre-enrollment data 136 may be deleted or otherwise discarded.

With the enrollment process complete, the first transaction data associated with the user may also be processed.

At 1232 the first transaction data is associated with the first identification data. For example, the first transaction data may be deemed to be associated with the identification data 144 in the enrolled user data 142.

At 1234 the first transaction data is processed using the first identification data. Continuing the example, a user identification or payment account information associated with the first identification data may be determined and used to process the first transaction data to bill the payment account specified by the payment account information.

In some implementations, at 136 second user interface data may be determined that indicates the completion of the enrollment process. The second user interface data may then be used to cause an output to the user. For example, the second user interface data may comprise text that may be presented to the user via an output device such as a display device.

The operations shown in FIG. 12C with respect to 1238 through 1250 may be associated with a third time. In some implementations, different biometric input devices 104 may acquire different modalities of biometric input image data 112. For example, the biometric input device 104(1) may acquire biometric input image data 112(1) using a first and second modality, while the biometric input device 104(2) may acquire biometric input image data 112(2) using only a second modality.

During subsequent use of the system 100, such as during subsequent transactions by the user, the use of biometric input devices 104 and the resulting biometric input image data 112 and corresponding representation data 132 may be associated with the previously enrolled user data 142 and stored as enrolled representation data 146, while still facilitating completion of the transaction specified by the transaction data.

In some implementations, at 1238 second transaction data associated with a third device is determined. The transaction data may be indicative of a purchase, request for physical access, authorization to perform a function, and so forth.

At 1240 third input image data is acquired using the third device. For example, the biometric input device 104 may be used to acquire the biometric input image data 112(2) at the third time.

At 1242 third representation data 132(3) is determined based on the third input image data. For example, the biometric input image data 112(2) may be processed by one or more of the processing modules 130 to determine the third representation data 132(3).

At 1244 the third representation data 132(3) is determined to be associated with one or more of the first representation data 132(1) or the second representation data 132(2). Similar to the process described above with regard to 1224, if the association is greater than a threshold value the process may proceed to 1246. If not, additional data may be acquired and used for further comparison.

At 1246 the third representation data 132(3) is stored. The third representation data 132(3) is associated with the first identification data. For example, the third representation data 132(3) may be stored as the enrolled representation data 146 and associated with the identification data 144.

At 1248 the second transaction data is determined to be associated with the first identification data. For example, the first transaction data may be deemed to be associated with the identification data 144 in the enrolled user data 142.

At 1250 the second transaction data is processed using the first identification data. Continuing the example, a user identification or payment account information associated with the first identification data may be determined and used to process the second transaction data to bill the payment account specified by the payment account information.

FIG. 13 is a flow diagram 1300 of a process to perform a pre-enrollment process using an intersection comparison, according to some implementations. The process may be implemented by one or more computing devices of the system 100, such as a computing device of the general input device 170, the computing device 106 of the biometric input device 104, the computing devices 118, or other devices.

The user opts in to use the system. The follow process may then be initiated following the opt-in by the user.

At 1302 a first device is determined to be approved for use in the pre-enrollment process. For example, the first device may be a general input device 170 having a specified make, model, manufacturer, operating system, specified application, application version, geolocation, and so forth. In one implementation, the first device may send information such as first supplemental data 174(1) to the computing device 118 as part of a request to initiate the pre-enrollment process. The computing device 118 may determine that the first supplemental data 174(1) indicates an approved make and model of general input device 170 that is located within an approved geolocation or geofenced area, such as a specified state or country. In some implementations, a general input device 170 that is approved for use may comprise a camera capable of a minimum resolution, a flash capable of specified illumination, a secure compute environment (SCE), and so forth.

At 1304 first input image data is acquired using the first device. For example, the general input device 170 may be used to acquire the general input image data 172 at a first time.

At 1306 first supplemental data 174(1) is determined that is associated with the first input image data. The first supplemental data 174(1) may be determined by the first device or by other devices or systems associated with the first device. For example, the first supplemental data 174(1) may be determined by the general input device 170 contemporaneously with the acquisition general input image data 172. In another example, an application server in communication with an application executing on the general input device 170 to acquire the general input image data 172 may determine the first supplemental data 174(1).

At 1308, based on the first input image data, first intersection representation data in an intersection space is determined. For example, the general input image data 172 may be processed as described with regard to FIG. 7 to determine the first intersection representation data 454(1).

At 1310 first identification data is determined that is associated with the first input image data. For example, pre-enrollment identification data 184 may be received from the general input device 170, retrieved from storage, and so forth.

At 1312, one or more of the first supplemental data 174(1), the first intersection representation data, or the first identification data are stored. For example, the first intersection representation data may be stored as the pre-enrollment representation data 182. Continuing the example, the pre-enrollment identification data 184 is stored. Furthering the example, the first supplemental data 174(1) may be stored. Also stored is an association between the pre-enrollment representation data 182 and the pre-enrollment identification data 184 and the first supplemental data 174(1).

At 1314 second input image data is acquired using a second device. For example, the biometric input device 104 may be used to acquire the biometric input image data 112 at the second time.

At 1316, second representation data 132(2) is determined based on the second input image data. For example, the biometric input image data 112 may be processed by one or more of the processing modules 130 to determine the second representation data 132(2).

At 1318 the second representation data 132(2) is determined to not be associated with stored enrolled user data 142. For example, the identification module 150 may accept as input the second representation data 132(2) and return data indicative of no corresponding enrolled representation data 146.

At 1320 second supplemental data 174(2) is determined that is associated with the second input image data. The second supplemental data 174(2) may be determined by the biometric input device 104 or by other devices or systems associated with the biometric input device 104. For example, the second supplemental data 174(2) may be determined by the biometric input device 104 contemporaneously with the acquisition of biometric input image data 112. Continuing the example, the supplemental data 174(2) may comprise data indicative of operation of the biometric input device 104 during acquisition of the second input image data, data acquired from electronically reading an EMV card, and so forth.

At 1322 the second supplemental data 174(2) is determined to correspond with one or more of the first identification data or the first supplemental data 174(1). For example, the supplemental data 174 may specify a geolocation of the respective devices and a time of use. If the geolocations are within a threshold distance and the times of use are within a threshold time, the two may be deemed to correspond. In another example, if the first identification data indicates a user having the legal name "Abhi Patel" and the electronically read EMV card data is associated with a legal name of "Abhi Patel", the two may be deemed to correspond.

At 1324 based on the second input image data, second intersection representation data in the intersection space is determined. For example, the biometric input image data 112 may be processed as described with regard to FIG. 7 to determine the second intersection representation data 454(2).

At 1326 the first intersection representation data is determined to be associated with the second intersection representation data. For example, the intersection output data 702 may be determined and processed to determine the comparison result data 724 that indicates the first intersection representation data 454(1) is associated with the second intersection representation data 454(2).

Because the first intersection representation data 454(1) is based on the processing of the general input image data 172 and the second intersection representation data 454(2) is based on the processing of the biometric input image data 112, the general input image data 172 is deemed to correspond to the biometric input image data 112. Similarly, other data based thereon is deemed to correspond. For example, the first representation data 420 is deemed to correspond with the second representation data 422.

At 1328 the second representation data 132(2) and the first identification data are stored. For example, the second representation data 132(2) may be stored as the enrolled representation data 146, and at least a portion of the pre-enrollment identification data 184 or data based thereon may be stored as the identification data 144. Also stored is an association between the particular enrolled representation data 146 and the particular identification data 144.

With the enrollment process complete, the associated pre-enrollment data 136 may be deleted or otherwise discarded.

FIG. 14 is a flow diagram 1400 of a process to perform a pre-enrollment process using a transform comparison, according to some implementations. The process may be implemented by one or more computing devices of the system 100, such as a computing device of the general input device 170, the computing device 106 of the biometric input device 104, the computing devices 118, or other devices.

The user opts in to use the system. The following process may then be initiated following the opt-in by the user.

At 1402 a first device is determined to be approved for use in the pre-enrollment process. For example, the first device may be a general input device 170 having a specified make, model, manufacturer, operating system, specified application, application version, geolocation, and so forth. In one implementation, the first device may send information such as first supplemental data 174(1) to the computing device 118 as part of a request to initiate the pre-enrollment process. The computing device 118 may determine that the first supplemental data 174(1) indicates an approved make and model of general input device 170 that is located within an approved geolocation or geofenced area, such as a specified state or country. In some implementations, a general input device 170 that is approved for use may comprise a camera capable of a minimum resolution, a flash capable of specified illumination, an SCE, and so forth.

At 1404 first input image data is acquired using the first device. For example, the general input device 170 may be used to acquire the general input image data 172 at a first time.

At 1406 first supplemental data 174(1) is determined that is associated with the first input image data. The first supplemental data 174(1) may be determined by the first device or by other devices or systems associated with the first device. For example, the first supplemental data 174(1) may be determined by the general input device 170 contemporaneously with the acquisition of the general input image data 172. In another example, an application server in communication with an application executing on the general input device 170 to acquire the general input image data 172 may determine the first supplemental data 174(1).

At 1408, based on the first input image data, first representation data in a first representation space is determined. For example, the general input image data 172 may be processed as described with regard to FIG. 10 to determine the first representation data 1010.

At 1410 first identification data is determined. For example, pre-enrollment identification data 184 may be received from the general input device 170, retrieved from storage, and so forth.

At 1412, one or more of the first supplemental data 174(1), the first representation data, or the first identification data are stored. For example, the first representation data may be stored as the pre-enrollment representation data 182. Continuing the example, the pre-enrollment identification data 184 is stored. Furthering the example, the first supplemental data 174(1) may be stored. Also stored is an association between the pre-enrollment representation data 182 and the pre-enrollment identification data 184 and the first supplemental data 174(1).

At 1414 based on the first representation data, first transformed representation data 914 is determined that is in a second representation space. For example, the trained transformer network module 910 may accept as input the first representation data 1010 and provide as output the first transformed representation data 914.

In some implementations, the operation at 1416 may be performed. At 1416 the first transformed representation data 914 is determined to not be associated with stored enrolled user data 142. For example, the identification module 150 may accept as input the first transformed representation data 914 and return data indicative of no corresponding enrolled representation data 146.

At 1418 second input image data is acquired using a second device. For example, the biometric input device 104 may be used to acquire the biometric input image data 112 at the second time.

At 1420, second representation data 1012 in the second representation space is determined based on the second input image data. For example, the biometric input image data 112 may be processed by one or more of the processing modules 130 to determine the second representation data 1012.

At 1422 the second representation data 1012 is determined to not be associated with stored enrolled user data 142. For example, the identification module 150 may accept as input the second representation data 1012 and return data indicative of no corresponding enrolled representation data 146.

At 1424 second supplemental data 174(2) is determined that is associated with the second input image data. The second supplemental data 174(2) may be determined by the biometric input device 104 or by other devices or systems associated with the biometric input device 104. For example, the second supplemental data 174(2) may be determined by the biometric input device 104 contemporaneously with the acquisition biometric input image data 112. Continuing the example, the second supplemental data 174(2) may comprise data indicative of operation of the biometric input device 104 during acquisition of the second input image data, data acquired from electronically reading an EMV card, and so forth.

At 1426 the second supplemental data 174(2) is determined to correspond with one or more of the first identification data or the first supplemental data 174(1). For example, the supplemental data 174 may specify a geolocation of the respective devices and a time of use. If the geolocations are within a threshold distance and the times of use are within a threshold time, the two may be deemed to correspond. In another example, if the first identification data indicates a user having the legal name "Abhi Patel" and the electronically read EMV card data is associated with a legal name of "Abhi Patel", the two may be deemed to correspond.

At 1428 the first transformed representation data 914 is determined to be associated with the second representation data 1012. For example, the transformed representation data 914 and the second representation data 1012 may be processed as described with regard to FIG. 10 to determine the comparison result data 1024 that indicates the transformed representation data 914 is associated with the second representation data 1012. Because the transformed representation data 914 is based on the first representation data 1010, the first representation data 1010 is deemed to be associated with the second representation data 1012. As a result, the general input image data 172 is deemed to correspond to the biometric input image data 112.

At 1430 the second representation data 1012 and the first identification data are stored. For example, the second representation data 1012 may be stored as the enrolled representation data 146, and at least a portion of the pre-enrollment identification data 184 or data based thereon may be stored as the identification data 144. Also stored is an association between the particular enrolled representation data 146 and the particular identification data 144.

With the enrollment process complete, the associated pre-enrollment data 136 may be deleted or otherwise discarded.

The devices and techniques described in this disclosure may be used in a variety of other settings. For example, the system 100 may be used in conjunction with a point-of-sale (POS) device. The user may present their hand 102 to a biometric input device 104 to provide an indication of intent and authorization to pay with an account associated with the asserted identification data 152. In another example, a robot may incorporate a biometric input device 104. The robot may use the asserted identification data 152 to determine whether to deliver a parcel to the user, and based on the asserted identification data 152, which parcel to deliver.

While the input to the system 100 is discussed with respect to image data, the system may be used with other types of input. For example, the input may comprise data acquired from one or more sensors 1116, data generated by another system, and so forth. For example, instead of image data produced by the camera 108, the input to the system 100 may comprise an array of data. Other modalities may also be used. For example, the first modality may be visible light, the second modality may be sonar, and so forth.

While the system 100 is discussed with respect to processing biometric data, the system may be used with other types of data. For example, the input may comprise satellite weather imagery, seismic data, product images, data indicative of chemical composition, and so forth. For example, instead of image data produced by the camera 108, the input to the system 100 may comprise an array of data.

The processes discussed herein may be implemented in hardware, software, or a combination thereof. In the context of software, the described operations represent computer-executable instructions stored on one or more non-transitory computer-readable storage media that, when executed by one or more processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:

one or more memories, storing first computer-executable instructions; and one or more hardware processors to execute the first computer-executable instructions to:

begin a pre-enrollment process by performing steps to:

acquire, at a first time, first input image data of a hand of a user using a first device, wherein:

the first input image data is associated with a first modality, and the first device is of a first type configured to acquire image data with the first modality;

determine, at a second time, first representation data using a first portion of a machine learning network to process the first input image data;

determine, at a third time, first identification data associated with the first input image data; and store, at a fourth time, the first identification data and the first representation data as pre-enrollment data; and after the pre-enrollment process has been completed, complete an enrollment process by performing steps to:

acquire, at a fifth time, second input image data of the hand of the user using a second device, wherein:

the second input image data is associated with a second modality, the second device is of a second type that is different from the first type, and the second device is configured to acquire image data with the second modality that is different from the first modality;

determine, at a sixth time, second representation data using a second portion of the machine learning network to process the second input image data;

determine, at a seventh time, that the first representation data is associated with the second representation data; and store, at an eighth time, the first identification data and the second representation data as enrolled user data, wherein the first identification data is associated with the second representation data.

2. The system of claim 1, the one or more hardware processors to further execute the first computer-executable instructions to:

determine, after the fourth time, transaction data that is associated with the second device;

determine, after the eighth time, that the first identification data is associated with the transaction data; and process the transaction data using the first identification data.

3. The system of claim 1, the one or more hardware processors to further execute the first computer-executable instructions to:

determine, before the first time, that one or more of the first device or an application executing on the first device are approved for use.

4. The system of claim 1, the one or more hardware processors to further execute the first computer-executable instructions to:

determine, before the seventh time, that the second representation data is not associated with previously enrolled representation data.

5. The system of claim 1, the one or more hardware processors to further execute the first computer-executable instructions to:

delete the first representation data after one of:

the first representation data is associated with the second representation data, or the first representation data has been stored for longer than a specified time.

6. The system of claim 1, the one or more hardware processors to further execute the first computer-executable instructions to:

determine first supplemental data that is associated with the first device and the first time;

determine second supplemental data that is associated with the second device and the second time; and determine, before the seventh time, that at least a portion of the first supplemental data corresponds to the second supplemental data.

7. The system of claim 1, the one or more hardware processors to further execute the first computer-executable instructions to:

determine supplemental data that is associated with the second device and the second time; and determine, before the seventh time, that at least a portion of the supplemental data corresponds to the first identification data.

8. The system of claim 1, the one or more hardware processors to further execute the first computer-executable instructions to:

determine, using a third portion of the machine learning network to process the first input image data, first intermediate representation data;

determine first intersection representation data using a fourth portion of the machine learning network to process the first intermediate representation data;

determine, using a fifth portion of the machine learning network to process the second input image data, second intermediate representation data;

determine second intersection representation data using a sixth portion of the machine learning network to process the second intermediate representation data; and determine, based on the first intersection representation data and the second intersection representation data, that the first representation data is associated with the second representation data.

9. The system of claim 8, the one or more hardware processors to further execute the first computer-executable instructions to:

determine a first distance in an intersection embedding space between the first intersection representation data and the second intersection representation data; and determine that the first representation data is associated with the second representation data based on the first distance being less than a threshold distance.

10. The system of claim 1, the one or more hardware processors to further execute the first computer-executable instructions to:

determine transformed representation data using a second machine learning network to process the first representation data, wherein the transformed representation data and the second representation data are associated with an embedding space; and determine, based on the transformed representation data and the second representation data, that the first representation data is associated with the second representation data.

11. A computer-implemented method comprising:

acquiring first input image data of a hand of a user using a first device of a first type, wherein the first device is configured to acquire image data of a first modality;

determining first representation data based on the first input image data;

determining first identification data associated with the first input image data;

storing the first identification data and the first representation data;

after the storing the first identification data and the first representation data, acquiring second input image data of the hand of the user using a second device of a second type that is different from the first type, wherein the second device is configured to acquire image data of a second modality that is different from the first modality;

determining second representation data based on the second input image data;

determining that the first representation data is associated with the second representation data; and storing the first identification data and the second representation data as enrolled user data, wherein the first identification data is associated with the second representation data.

12. The method of claim 11, further comprising:

acquiring third input image data using a third device;

determining third representation data based on the third input image data;

determining that the third representation data is associated with one or more of the first representation data or the second representation data; and storing the third representation data, wherein the first identification data is associated with the third representation data.

13. The method of claim 11, further comprising:

determining first supplemental data that is associated with the first input image data;

determining second supplemental data that is associated with the second input image data; and determining that at least a portion of the first supplemental data corresponds to the second supplemental data.

14. The method of claim 11, further comprising:

determining, using a first portion of a machine learning network to process the first input image data, first intermediate representation data;

determining first intersection representation data using a second portion of the machine learning network to process the first intermediate representation data;

determining, using a third portion of the machine learning network to process the second input image data, second intermediate representation data;

determining second intersection representation data using a fourth portion of the machine learning network to process the second intermediate representation data; and determining, based on the first intersection representation data and the second intersection representation data, that the first representation data is associated with the second representation data.

15. The method of claim 11, further comprising:

determining transformed representation data using a machine learning network to process the first representation data, wherein the transformed representation data and the second representation data are associated with an embedding space; and determining, based on the transformed representation data and the second representation data, that the first representation data is associated with the second representation data.

16. A system comprising:

one or more memories, storing first computer-executable instructions; and one or more hardware processors to execute the first computer-executable instructions to:

acquire first input image data of a hand of a user using a first device of a first type, wherein the first input image data is associated with a first modality;

determine first representation data based on the first input image data;

determine first identification data associated with the first input image data;

store the first identification data and the first representation data;

acquire second input image data of the hand of the user using a second device of a second type that is different from the first type, wherein the second input image data is associated with a second modality that is different from the first modality;

determine second representation data based on the second input image data;

determine that the first representation data is associated with the second representation data; and store the first identification data and the second representation data as enrolled user data, wherein the first identification data is associated with the second representation data.

17. The system of claim 16, the one or more hardware processors to execute the first computer-executable instructions to:

acquire third input image data using a third device, wherein the third device utilizes at least a third modality to acquire the third input image data;

determine third representation data based on the third input image data;

determine the third representation data is associated with one or more of the first representation data or the second representation data; and store the third representation data, wherein the first identification data is associated with the third representation data.

18. The system of claim 16, the one or more hardware processors to further execute the first computer-executable instructions to:

determine transaction data that is associated with the second device;

determine that the first identification data is associated with the transaction data; and process the transaction data using the first identification data.

19. The system of claim 16, the one or more hardware processors to further execute the first computer-executable instructions to:

determine first supplemental data that is associated with the first input image data;

determine second supplemental data that is associated with the second input image data; and determine that at least a portion of the first supplemental data corresponds to the second supplemental data.

* * * * *